(12) United States Patent
May et al.

(10) Patent No.: US 12,644,693 B2
(45) Date of Patent: Jun. 2, 2026

(54) INTERFEROMETRIC MEASURING DEVICE

(71) Applicant: TAYLOR HOBSON LTD., Leicester (GB)

(72) Inventors: Thilo May, Darmstadt (DE); Christian Am Weg, Darmstadt (DE)

(73) Assignee: TAYLOR HOBSON LTD., Leicester (GB)

( * ) Notice: Subject to any disclaimer, the term of this patent is extended or adjusted under 35 U.S.C. 154(b) by 113 days.

(21) Appl. No.: 17/918,987

(22) PCT Filed: Apr. 14, 2021

(86) PCT No.: PCT/EP2021/059607
§ 371 (c)(1),
(2) Date: Oct. 14, 2022

(87) PCT Pub. No.: WO2021/209478
PCT Pub. Date: Oct. 21, 2021

(65) Prior Publication Data
US 2023/0236006 A1 Jul. 27, 2023

(30) Foreign Application Priority Data
Apr. 16, 2020 (EP) ..................................... 20169784

(51) Int. Cl.
*G01B 11/06* (2006.01)
*G01B 9/02* (2022.01)
(Continued)

(52) U.S. Cl.
CPC ................ *G01B 11/06* (2013.01); *G01B 9/02* (2013.01); *G01B 11/2441* (2013.01); *G01B 11/27* (2013.01)

(58) Field of Classification Search
CPC ..... G01B 11/06; G01B 11/2441; G01B 11/27; G01B 11/0675; G01B 9/02; G01M 11/0221; G01M 11/0271
See application file for complete search history.

(56) References Cited

U.S. PATENT DOCUMENTS 3,471,239 A * 10/1969 Woodson ................. G01B 9/02
359/638
4,272,190 A * 6/1981 Shapiro .............. G01M 11/0235
356/124
(Continued)

FOREIGN PATENT DOCUMENTS

DE 10 2011 011 065 A1 8/2012
DE 10 2018 109 649 A1 10/2019
(Continued)

OTHER PUBLICATIONS

European Patent Office, International Preliminary Report on Patentability and Written Opinion of the International Searching Authority PCT/EP2021/059607, Oct. 13, 2022 (Oct. 13, 2022), 8 pages, European Patent Office, Munich, Germany (DE).
(Continued)

*Primary Examiner* — Mohamed K Amara
(74) *Attorney, Agent, or Firm* — NK Patent Law

(57) ABSTRACT
A method of measuring a surface of an optical element and an interferometric measuring device for measuring a surface or profile of the optical element. The optical element having a first surface and a second surface opposite the first surface. The method includes defining at least a first measurement point, a second measurement point and a third measurement point on a measurement surface of the optical element being one of the first surface and the second surface, measuring a first position of the first measurement point by directing a measurement beam from a measurement head onto the first measurement point and by detecting a measurement beam
(Continued)

portion reflected at the first measurement point, subsequently measuring at least a second position of the second measurement point and a third position of the third measurement point by directing the measurement beam onto the second measurement point and onto the third measurement point and by detecting a measurement beam portion reflected at the second measurement point and the third measurement point, respectively, and determining at least one of a decenter and a tilt of the measurement surface relative to a reference axis on the basis of at least the first position, the second position and the third position.

19 Claims, 13 Drawing Sheets

(51) Int. Cl.
    *G01B 11/24*     (2006.01)
    *G01B 11/27*     (2006.01)

(56)         References Cited

U.S. PATENT DOCUMENTS

| 4,786,124 | A | * | 11/1988 | Stone | G02B 26/00 |
| | | | | | 359/15 |
| 5,067,817 | A | * | 11/1991 | Glenn | G01B 11/24 |
| | | | | | 356/613 |
| 5,467,192 | A | * | 11/1995 | Manning | G01B 11/255 |
| | | | | | 356/124 |
| 5,572,598 | A | * | 11/1996 | Wihl | G01N 21/95607 |
| | | | | | 382/145 |
| 5,909,282 | A | * | 6/1999 | Kulawiec | G01B 11/06 |
| | | | | | 356/504 |
| 6,072,581 | A | * | 6/2000 | Stephenson | G01B 11/306 |
| | | | | | 356/521 |
| 6,396,588 | B1 | * | 5/2002 | Sei | G01J 9/00 |
| | | | | | 356/512 |
| 6,847,458 | B2 | * | 1/2005 | Freischlad | G01B 9/02021 |
| | | | | | 356/511 |
| 7,262,861 | B1 | * | 8/2007 | Pepper | G01B 17/02 |
| | | | | | 356/502 |
| 7,605,926 | B1 | * | 10/2009 | Hetzler | G01B 9/02057 |
| | | | | | 356/521 |
| 8,269,981 | B1 | * | 9/2012 | Doerband | G01B 11/2441 |
| | | | | | 356/512 |
| 9,019,485 | B2 | * | 4/2015 | Ignatovich | G01M 11/0207 |
| | | | | | 356/73 |
| 9,714,825 | B2 | * | 7/2017 | Marx | G01B 11/22 |
| 2002/0109851 | A1 | * | 8/2002 | Deck | G01B 9/02028 |
| | | | | | 356/512 |
| 2003/0030819 | A1 | * | 2/2003 | Kuechel | G01B 9/02059 |
| | | | | | 356/512 |
| 2003/0160968 | A1 | * | 8/2003 | Deck | G01B 9/02021 |
| | | | | | 356/515 |
| 2007/0247639 | A1 | | 10/2007 | Amstel et al. | |
| 2008/0218744 | A1 | * | 9/2008 | Abe | G01K 11/125 |
| | | | | | 356/73 |
| 2010/0053630 | A1 | * | 3/2010 | Oota | G01B 9/02057 |
| | | | | | 356/243.4 |
| 2012/0154819 | A1 | * | 6/2012 | Cobb | G01B 9/02004 |
| | | | | | 356/513 |
| 2013/0010286 | A1 | * | 1/2013 | Zhao | G01B 11/255 |
| | | | | | 356/73 |
| 2014/0211191 | A1 | | 7/2014 | Jensen et al. | |
| 2017/0082521 | A1 | | 3/2017 | May et al. | |
| 2018/0299250 | A1 | * | 10/2018 | Kay | G01B 11/14 |
| 2019/0265023 | A1 | * | 8/2019 | Deck | G01B 9/02016 |
| 2019/0339060 | A1 | * | 11/2019 | Ohba | B05C 5/00 |
| 2023/0031531 | A1 | * | 2/2023 | Liesener | G01B 11/2441 |
| 2025/0123094 | A1 | * | 4/2025 | Burge | G01B 9/027 |

FOREIGN PATENT DOCUMENTS

| JP | 2007-536552 | A | 12/2007 |
| WO | 2005/108917 | A2 | 11/2005 |
| WO | 2016025769 | A1 | 2/2016 |
| WO | 2019/206371 | A1 | 10/2019 |

OTHER PUBLICATIONS

European Patent Office, International Search Report PCT/EP2021/059607, Jun. 10, 2021 (Jun. 10, 2021), 3 pages, European Patent Office, Rijswijk, Netherlands (NL).

Stover E. et al., Fast optical 3D form measurement of aspheres including determination of thickness and wedge and decenter errors, Proceedings of SPIE, US, vol. 9633, Oct. 11, 2015 (Oct. 11, 2015), pp. 963310-XP060062792, Abstract, Sections 2.2, 3, 5.1.

Herbert Gross, Testing the Geometry of Optical Components, Handbook of Optical Systems, vol. 5: Metrology of Optical Components and Systems, Apr. 30, 2012 (Apr. 30, 2012), Wiley-VCH Verlag GmbH, pp. 679-783 XP055426348, pp. 692, 766-767.

CNIPA; First Office Action for corresponding Chinese Patent Application No. 2021800429975, issued Aug. 9, 2025, 16 pages.

* cited by examiner

INTERFEROMETRIC MEASURING DEVICE

FIELD OF THE INVENTION

The present invention relates to the field of interferometric measuring devices, in particular to fiber-implemented interferometric measuring devices for measuring a surface, a distance and/or profile of an object by reflection of electromagnetic radiation from a surface of the object.

BACKGROUND OF THE INVENTION

Quality control and a precise measurement of optical surfaces of optical elements, such as lenses, gains more and more importance, in particular for mass-manufactured optical elements. This might particularly apply to rather small-sized optical elements, that can be used for instance in miniaturized camera-, imaging- and/or display systems.

For instance, DE 10 2011 011 065 B4 discloses an apparatus for measurement of at least one surface section of an object mounted on a carrier. The apparatus comprises a reference object, which is fixable in relation to the carrier, and a holder that is movable in relation to the reference object in at least a first direction.

A reference body and a distance sensor, which are mounted in a rotational manner relative to one another are arranged on the holder. A distance measuring device is configured to determine a first distance to a first point on the surface of the object and to determine a second distance to a second point on the reference body corresponding with the first point on the object. For this, the distance measuring device comprises a first and a second distance sensor, one of which facing the object and the other of which facing the reference body. With such an apparatus, the surface of the object can be optically probed or scanned in a highly precise and contactless manner.

For measuring of a thickness, in particular for measuring of a thickness profile of the object and for the determination of a wedge or tilt of optical surfaces document US 2017/0082521 A1 discloses another apparatus making use of an object holder having an upper side and a lower side, wherein the object holder is selectively adapted to be arranged in a first and with a second orientation on a carrier. For measuring of a thickness of the object and for mutually assigning surface profiles provided on opposite sides of the object it is required to measure or to scan a first or upper surface of the object with the object holder positioned in the first orientation. Subsequently, the object has to be measured or scanned with the object holder in its second orientation.

Placing of the object holder relative to a distance measuring device as well as reorienting of the object holder with the object mounted thereon may require a manual adjustment and/or calibration of the respective measurement device, which might be sometimes rather elaborate and time-consuming.

Such a calibration and adjustment might of particular relevance, e.g. when the object to be measured and a respective amount for the object is provided on a rotating measurement stage, which during the scanning of the surface of the optical element or object is subject to a rotation. For such a measurement scheme it might be generally required, that the optical axis of the optical element to be measured is aligned with the axis of rotation of the measurement stage.

In particular with a surface measurement or distance measurement based on interferometry it is necessary that the distance between a measurement head and the surface of the optical element to be measured remains within a predefined measurement range. With optical interference-based measurement methods, the measurement range and hence the area of unambiguousness for the respective distance measurement is given and determined by the wavelength of a measurement beam. The measurement range and hence the range of unambiguousness may be extended, e.g. by using multiple measurement beams of different wavelength simultaneously. However, there generally applies the rule, that increasing the spatial resolution of a measurement comes along with a respective reduction of a measurement range and hence of a range of unambiguousness.

OBJECTS OF THE INVENTION

It is therefore an object of the present invention to provide an improved method of measuring a surface and to provide an improved measuring device, e.g. an interferometric measuring device for measuring a surface or profile of an optical element. The measuring device and the method should provide a rather effective and fast measuring as well as calibration and adjusting of the interferometric measuring device. Moreover, the method and the measuring device should provide a rather precise and fast measuring of a decenter, a thickness and/or a tilt of at least one or of opposite surfaces of the optical element without the necessity to modify a bearing or mounting of the optical element relative to a measuring device.

It is another object of the present invention to provide a respective computer program to execute such a measuring method and to control a respective interferometric measuring device.

SUMMARY OF THE INVENTION

In one aspect of the invention there is provided a method of measuring a surface and/or a profile of an optical element. The optical element comprises a first surface and a second surface. First and second surfaces are provided on opposite sides of the optical element. The first surface may be a top surface and the second surface may be a bottom surface of the optical element. The optical element may be an optical lens of arbitrary type.

In a first step the method includes defining of at least a first measurement point, a second measurement point and a third measurement point on a measurement surface of the optical element. The measurement surface is one of the first surface and the second surface. The measurement points are predefined measurement points. They may be chosen and/or defined in accordance to various criteria. For the present method of measuring the surface or profile of the optical element, respective first, second and third measurement points are defined and remain at least virtually fixed on the measurement surface at least during the method of measuring the surface or profile of the optical element.

Generally, the shape and/or the profile of the optical element is known at least to a minimum degree of precision. The surface and/or profile of the optical element is insofar quantitatively known. With the present method, the surface and/or the profile has to be precisely measured up to a maximum degree of precision, which is of course higher than the known minimum degree of precision. The minimum degree of precision may be provided by a manufacturer of the optical element. The maximum degree of precision may reveal manufacturing tolerances and/or the deficiencies of the surface or profile of the optical element. With typical examples, the minimum degree of precision is in the range of micrometers. The maximum degree of precision may be in the range of only a few nanometers, e.g. less than 50 nm, less than 20 nm or less than 10 nm.

The present method serves to provide a quality control and is hence configured to measure the surface and/or the profile of the optical element with a maximum degree of precision.

After having defined at least first, second and third measurement points on the measurement surface the first position of the first measurement point is measured by directing of a measurement beam from a measurement head onto the first measurement point. A measurement beam portion reflected, typically retroreflected, at the first measurement point is detected. By detecting of the reflected measurement beam portion the position of the first measurement point can be determined or calculated. For measuring of the first position of the first measurement point on the measurement surface a contactless optical measurement procedure is typically applied. The measurement procedure may include a runtime analysis and/or an analysis of a relative phase between the reflected measurement beam portion and a reference beam.

Typically, the measurement head is configured to direct the measurement beam onto the first measurement point and to detect the measurement beam portion reflected at the measurement beam point. Typically, the measurement head is aligned along a surface normal of the measurement surface in the region around or at the first measurement point. Typically, the measurement beam is directed perpendicularly onto the measurement surface at the first measurement point. The measurement beam portion reflected at the first measurement point therefore reenters the measurement head.

Deviations of the orientation of the measurement beam from a surface normal to the first measurement point might be acceptable to a predefined angle of acceptance of the measurement head. Typically, the angle of acceptance deviates by no more than 15° or preferably 10° or more preferably 5° from the surface normal of the first measurement point.

Thereafter, at least a second position of the second measurement point and a third position of the third measurement point are measured successively. Measuring of respective first and second measurement points is conducted in the same way as the above-described measurement of the first measurement point. Here, the measurement beam is directed onto the second measurement point and a respective measurement beam portion reflected at the second measurement point is detected, typically by the measurement head.

In the same way, the measurement beam is directed at least onto the third measurement point and a respective measurement beam portion reflected at the third measurement point is detected, typically by the measurement head.

On the basis of the at least first position, the at least second position and the at least third position at least one of a decenter and a tilt of the measurement surface relative to a reference axis is determined.

The reference axis may be defined by a measurement stage of a measuring device, on which the optical element can be positioned for the surface and/or profile measurement. The reference axis may be an axis of rotation with regards to which the optical element can be rotated during a surface scan or profile scan for determining at least one of a decenter and a tilt of the measurement surface.

In principle, the at least first position, the at least second position and the at least third position can be compared with respective reference positions in which the at least first, second and third measurement points would be located if the optical element were in alignment with the reference axis, e.g. with a zero tilt angle and/or at a zero decenter.

Typically, the actually measured first, second and third positions of the measurement points can be numerically analyzed and can be fitted into a mathematical model, which model has the decenter and the tilt of the measurement surface as variables. By numerical calculations, e.g. by fitting the first position, the second position and the third position to a respective first reference position, a second reference position and a third reference position the decenter and/or the tilt of the measurement surface relative to the reference axis or relative to a respective reference surface, e.g. defined by the first, second and third reference points can be determined.

Generally, there may be also derived a measured surface or measured profile on the basis of at least the first, the second and the third measurement points. The measured surface or profile may be compared or fitted into the mathematical model of the respective reference surface or reference profile.

In this way and simply by measuring a first position, a second position and a third position on a measurement surface the decenter and the tilt of a measurement surface can be determined qualitatively and/or quantitatively.

Generally, the number of measurement points is defined by the type of the measurement surface. Generally, first, second and third measurement point must not lie on a common straight line. A line may be drawn through the first measurement point and the second measurement point but then the third measurement point must be located offset from such a line. If the measurement surface is a spherical surface, the measurement surface can be unequivocally characterized by the first measurement point, the second measurement point and the third measurement point.

When the measurement surface is an aspherical surface, there must be defined and measured at least five measurement points. With optical elements comprising a so-called free-form surface as a measurement surface there will be required at least six measurement points that will have to be defined and subsequently measured by the above described method in order to determine or to calculate the decenter and/or the tilt of the measurement surface unequivocally. The number of measurement points depends on the number of degrees of freedom required for a definition of the respective measurement surface.

With typical examples, the decenter and the tilt as determined by the above described method can be directly used to adjust and/or to align the optical element for a subsequent highly precise surface measurement or profile measurement to be conducted with one and the same measuring device. In this way, the above described method of determining at least one of a decenter and a tilt of the measurement surface of the optical element can be directly used to align the optical element relative to a measurement head of the measuring device.

By determining at least one of a decenter and a tilt, the method may provide a quantitative feedback about the direction and the degree of the decenter as well as the direction and the degree of tilt. By precisely determining at least one of a decenter and a tilt of the measurement surface even a fully or semiautomated adjustment or calibration of the optical element relative to the measurement head or relative to the reference axis can be provided. This allows to reduce the expenditure and effort to precisely align and to calibrate the optical element for a highly precise surface and/or profile measurement to be conducted by a measuring device, e.g. an interferometric measuring device.

According to another embodiment, measuring of at least one of the first position, the second position and the third position includes focusing of the measurement beam onto at least one of the first measurement point, the second measurement point and the third measurement point and detecting of the respective measurement beam portion retroreflected at the at least one of the first measurement point, the second measurement point and the third measurement point, respectively. By focusing the measurement beam onto the first measurement point, an angle of acceptance of the measurement head for the reflected measurement beam portion can be increased.

Moreover, focusing of the measurement beam onto the respective measurement point increases the amount of light reflected at the respective measurement point. Here, a signal-to-noise ratio for the detection of the reflected measurement beam portion can be increased.

According to a further embodiment, one of the first surface and the second surface of the optical element faces towards the measurement head. The other one of the first surface and the second surface faces away from the measurement head. This other surface may face towards a measurement stage on which the optical element is mechanically supported. Here, the second surface facing away from the measurement head and which may face towards the measurement stage is the measurement surface. The first position, the second position and the third position is or are measured by directing the measurement beam onto a first target point located on that one of the first surface and the second surface facing towards the measurement head. Here, the measurement beam propagates through the medium of the optical element and hits the first measurement point. The measurement beam is at least partially reflected in or at the first measurement point. It is typically retroreflected through the medium towards the first target point and is propagating from the first target point back to the measurement head.

In the same way the method also proceeds with measuring the position of the second measurement point and the third measurement point through the medium of the optical element. For measuring the position of the second measurement point the measurement beam is directed onto a second target point located on that one of the first surface and the second surface facing towards the measurement head. In the same way and for measuring of the position of the third measurement point the measurement beam is directed onto a third target point on that one of the first and second surfaces that faces towards the measurement head.

The first target position is directly correlated with the first measurement point. The second target point is directly correlated with the second measurement point and the third target point is directly correlated to the third measurement point. If there are provided more than three measurement points there is provided also a respective number of target points on the surface opposite to the measurement surface.

Generally, the measurement points are provided on a common surface of the first and second surfaces. Also, the target points are provided on a common surface of the first and second surfaces of the optical element. The target points are always provided on a surface opposite to the surface on which the measurement points are located.

By directing the measurement beam onto at least a first, a second and a third target points, e.g. on the first surface the position of the measurement point on the second surface can be measured and hence determined. This has the benefit, that a measurement point provided on a measurement surface facing away from the measurement head can be directly measured without the necessity to reorient the optical element on a measurement stage, e.g. towards the measurement head.

The present method of measuring a surface and/or a profile of the optical element can be used to measure a surface facing towards the measurement head as well as to measure a surface that faces away from the measurement head. In this way, a measurement through the medium of the optical element can be provided. This allows to measure both, the first surface and the second surface with respect to their decenter and/or tilt relative to the reference axis, subsequently. Such subsequent measurements can be conducted in a common coordinate or reference system. The tilt and/or decenter of the first surface can be thus directly correlated to the tilt and/or decenter of the second surface.

Hence, in a first measurement procedure decenter and tilt of the first surface of the optical element can be measured by measuring at least the first, second and third positions of the first, second and third measurement points located on the first surface of the optical element. Thereafter, the measurement surface can be switched to the second surface without moving of the optical element relative to the measurement stage. During a second measurement procedure at least one of a decenter and a tilt of the second surface can be determined by subsequently directing the measurement beam onto at least the first, the second and the third target points on the first surface and by detecting respective reflected beam portions from first, second and third measurement points located on the second surface. In this way, at least one of a decenter and a tilt of the second surface of the optical element can be determined.

Generally, decenter and tilt of the first measurement surface can be determined relative to the reference axis. Since the optical element is not moved between the subsequent measurement procedures of the first surface and the second surface relative to a measurement stage at least one of a decenter and a tilt of the second surface of the optical element can be determined relative to the same reference axis. In this way, at least one of a decenter and a tilt of the first surface of the optical element can be directly correlated to at least one of a decenter and a tilt of the second surface of the optical element, respectively.

For a mutual mapping or assignment of decenter and/or tilt of the first surface relative to at least one of the decenter and the tilt of the second surface the optical element may remain stationary on a measurement stage. In this way a reorientation of the optical element between a first measurement procedure, in which the first surface is the measurement surface, and a second measurement procedure, in which the second surface is the measurement surface, is not necessary.

According to a further embodiment, the position of the first, the second and third target points on that one of the first surface and the second surface facing towards the measurement head is determined on the basis of at least one of a refractive index of the medium of the optical element, an angle of incidence of the measurement beam on the first, the second or third target point and a local surface profile of at least one of the first surface and the second surface in the region of the first, the second or third measurement point and/or in the region of the first, the second or third target points.

Moreover, the mutual mapping or assignment of the first target points to the first measurement point is also determined on the basis of the thickness or of the thickness profile of the optical element. It may also depend on the distance between the first surface and the second surface in the region of the first measurement point and the first target point. The same is valid for the mutual mapping of the second measurement point to the second target point as well as to the mutual mapping and assignment of the third measurement point to the third target points.

Typically, the at least first, second and third measurement points are defined on the measurement surface, e.g. coinciding with the second surface being a lower surface facing towards a measurement stage of the measuring device. The corresponding at least first, second and third target points are then located on the first surface opposite to the second surface.

The method generally provides measuring of the position of the first measurement point. For this, the general structure and shape as well as the refractive index of the optical element is known at least to a predefined minimum degree of precision. Based on the local profile and shape of the optical element the position of the first target point on the first surface is determined and/or calculated. For measuring of the position of the first measurement point it is required, that the measurement beam, which is subject to refraction at the first target point, is reflected, e.g. retroreflected at the first measurement point.

In order to have an effective retroreflection at the first measurement point through the optical medium of the optical element it is required that the reflected portion of the measurement beam propagating from the first target point towards the first measurement point hits the second surface substantially perpendicularly so that the reflected beam portion of the measurement beam propagating from the first measurement point back to the first target point and spatially overlaps with the measurement beam.

Since the refractive index of the material of the optical element differs from the refractive index of the surrounding air, also the refraction of the measurement beam at the first target point has to be taken into account. The degree of refraction strongly depends on the surface profile in the region of the first target point as well as on the refractive index of the medium of the optical element. With some embodiments, even a radial position of the measurement head is predefined and/or fixed. For a given radial position of the measurement head relative to the reference axis there may be always provided only one unequivocal pair of a target point and an angle of incidence for which the measurement beam hitting the target point is reflected at the target point enters the medium at the target point, propagates towards the predefined first measurement point through the medium and becomes retroreflected at the first measurement point.

Since the overall shape and profile of the optical element is at least known to a required minimum degree of precision and since the refractive index of the medium of the optical element is known, for each predefined measurement point of the at least first, second and third measurement points, there can be calculated and/or determined always one unequivocal first, second and third target point on the opposite surface of the optical element, respectively.

Measuring of the position of the at least first, second and third measurement point on a measurement surface facing away the optical head may also include the propagation of the measurement beam and the reflected beam portion through the medium of the optical element featuring a known refractive index. Moreover, the optical beam path along which the measurement beam and the reflected beam portion will propagate from the optical head through the medium towards the measurement point and back to the optical head will be taken into account for the position measurement.

According to a further embodiment, a first measurement path and a second measurement path are defined on the measurement surface. This may apply to both, the first surface as well as to the second surface, wherein the respective first and/or second surfaces are selected as a measurement surface. At least two of the first, the second and the third measurement points are located on the first measurement path. At least one of the first, the second and the third measurement point is located on the second measurement path.

By defining a measurement path, a multitude of respective measurement points lying on the respective measurement path(s) can be defined. In this way, the precision of the determination of at least one of the decenter and the tilt of the measurement surface can be improved. The more measurement points are actually measured, the more precise can be the calculation or determination of the at least one of the decenter and the tilt of the respective measurement surface.

With some embodiments the optical element has a radial symmetry. The optical element may comprise an optical axis. For the method of measuring the surface and/or profile of the optical element it is of particular benefit, when at least two of the at least first, second and third measurement points are located at a radial distance to an optical axis of the optical element that differ from each other.

Hence, at least one of the at least three measurement points may be located at a first radial distance to the optical axis of the optical element or radial center point of the optical element. Another one of the three measurement points is located at a second radial distance to the optical axis or the optical center point of the optical element. In this way, and by making use of at least two measurement points located at a different radial distance from the optical axis or center axis of the optical element, at least one of the decenter and the tilt of the measurement surface can be determined on the basis of measuring the position of at least the first, the second and the third measurement point.

According to a further embodiment, at least one of the first measurement path and the second measurement path is a closed measurement path. The measurement path may comprise a circle or an oval, e.g. an elliptically-shaped measurement path. A closed measurement path is of particular benefit when the optical element is mounted on a rotational measurement stage while the measurement head can be positioned at a variable radial distance to an axis of rotation of the measurement stage.

With a closed measurement path the measurement of the at least first, second and third measurement points may start at an arbitrary position of the measurement path. The measurement beam is directed along the measurement path due to a relative movement between the optical element and the measurement head until the measurement beam returns to the initial position on the measurement path.

According to another embodiment, the first measurement path and the second measurement path are concentric with regards to an optical axis of the optical element or with regards to the reference axis, e.g. defined by the measurement stage of the measuring device.

Concentric measurement paths, e.g. concentric measuring rings on which the at least first, second and third measurement points are located can be defined rather easily e.g. for a circular or disc-shaped optical element, such as a lens.

Generally, the definition of the shape of first and second measurement paths as well as their relative position may be chosen or calculated in accordance to the specific shape or profile of the optical element.

According to another example the optical element is attached to a mount. The mount is arranged on a measurement stage. The measurement stage is rotatable about an axis of rotation. At least one of a radial position and orientation of the mount relative to the axis of rotation is adjustable and is adjusted to minimize at least one of the decenter and the tilt of the optical element as determined by the present method.

With some embodiments, the axis of rotation of the measurement stage substantially coincides with the reference axis or defines the reference axis. With other embodiments, the reference axis is located offset from the axis of rotation of the measurement stage.

The mount is typically movable in radial direction relative to the axis of rotation. Moreover, the mount is tiltable or can be pivoted at least with regard to a tilt axis relative to the axis of rotation. Typically, the mount may be tiltable or pivotable with regard to at least two tiltable axes, e.g. lying in the plane perpendicular to the axis of rotation or perpendicular to the reference axis.

The mount may be adjusted by at least one electric drive in order to minimize at least one of the decenter and the tilt of the optical element relative to the reference axis. With this example, the method provides a kind of an automatic adjustment for the mount and hence for the optical element attached to the mount.

According to another embodiment, in a first measurement procedure at least one of the decenter and the tilt of one of the first surface and the second surface is determined and in a second measurement procedure at least one of the decenter and the tilt of the other one of the first surface and the second surface is determined. Between the first measurement procedure and the second measurement procedure the optical element and/or the mount remains stationary on the measurement stage. The optical element and hence the mount for the optical element may remain stationary relative to the reference axis.

In this way the decenter and/or the tilt determined during the first measurement procedure can be directly correlated and/or mapped to the decenter and/or the tilt obtained during the second measurement procedure According to another embodiment, the method of measuring the surface and/or the profile of the optical element includes measuring of a thickness of the optical element along an optical axis of the optical element. Measuring of the thickness includes aligning of the measurement head along or parallel to the optical axis of the optical element, directing the measurement beam along or parallel to the optical axis and moving of the focused measurement beam along or parallel to the optical axis and finally detecting of a coincidence of a focal area of the focused measurement beam with the first surface and/or with the second surface.

Generally and for measuring of the thickness of the optical element, the measurement beam is directed along a surface normal of a measurement point located on a first surface. A portion of the measurement beam is transmitted through the optical element and is reflected at a corresponding second measurement point located on a second surface, opposite to the first surface. Here, the surface normal of the second point and the surface normal of the first point are substantially parallel. Generally, and for measuring of the thickness, the focused measurement beam is moved or scanned in longitudinal direction or axial direction, hence along the direction of the measurement beam.

For this, the measurement range of the measurement head may be reduced to a measurement range being substantially shorter than the expected thickness of the optical element. When the focused measurement beam coincides with one of the first surface and the second surface, the intensity of the reflected measurement beam portion is at a maximum. By subsequently moving the measurement beam, e.g. by scanning the measurement beam along or parallel the optical axis through the medium of the optical element a further maximum of reflected beam intensity can be detected. Those positions of the measurement head along the optical axis at which a local maximum of a reflected beam portion can be detected are indicative of a coincidence of the focused beam with one of the first surface and the second surface along the optical axis.

The position of the measurement head along or parallel to the optical axis at which the focused measurement beam coincides with the first surface is compared to the second position of the measurement beam along or parallel to the optical axis at which the focused measurement beam coincides with the second surface. For a calculation of the thickness of the optical element the respective first and second positions of the measurement head are compared or subtracted from each other. Here, the refractive index of the medium of the optical element is further taken into account.

In order to distinguish between a reflected measurement beam portion reflected form the first surface or from the second surface of the optical element the measurement range of the measurement head should be less than the thickness of the optical element. With an interferometric measurement device, the coherence length of the measurement beam should be shorter or smaller that a distance between the first surface and the second surface along the optical axis c. This can be obtained by making use of an appropriate light source, as well as by making use of an optical retarding element in the optical path of the signal beam and/or in the optical path of the reference beam of the interferometric measurement device. For instance, a laser or a super-luminescent diode could be used as a light source.

Measuring of the thickness of the optical element may be conducted even without the above-described measurement of the first, second and third positions of respective first, second and third measurement point of a measurement surface as described above. Nevertheless, measurement of the thickness is of particular benefit when the optical element has been properly aligned and exhibits a minimum decenter or minimum tilt with respect to the reference axis.

Hence, in another aspect of the invention there is provided a method for measuring of a thickness of the optical element along an optical axis (c), the thickness measurement includes aligning of a measurement head along an the optical axis of an optical element, directing of a measurement beam from the measurement head along or parallel to the optical axis and moving or scanning of the focused measurement beam along or parallel to the optical axis.

During the moving or scanning of the focused measurement beam a coincidence of a focal area of the focused measurement beam with a first surface and/or with a second surface of the optical element is detected. The position and movement of the measurement head along the optical axis is tracked and controlled.

A distance between a first position of the measurement head, at which the focal area of the focused measurement beam coincides with the first surface and a second position of the measurement head, at which the focal area of the focused measurement beam coincides with the second surface is directly indicative of the thickness of the optical element along the optical axis or in a direction parallel to the optical axis.

The distance between the first position and the second position is further normalized or compensated in view of the refractive index of the medium of the optical element.

Measuring of the thickness of the optical element may be conducted along the optical axis, hence along a center axis of the optical element. Measuring of the thickness of the optical element may be also conducted along a direction parallel to the optical axis. Here, the measurement beam is aligned parallel to the optical axis but is located radially or transversely offset from the optical axis. In this way, the thickness of the optical element can be also measured off-center from the optical axis. Generally, the thickness of the optical element can be measured at numerous and mutually interrelated or mutually corresponding points on the first surface and on the second surface, respectively. In this way, even a thickness profile of the optical element can be obtained.

Generally, the method of measuring the thickness can be implemented even without or independent from the above described measurement of at least a first, a second and a third measurement point. It can be also conducted without a prior determination of the decenter or tilt of the measurement surface of the optical element.

With a further embodiment of the method of measuring the surface of profile of the optical element, based on the determined tilt and/or decenter, the optical element is adjusted relative to the interferometric measuring device, in particular relative to a measurement head. In this way, an elimination or at least a substantial reduction of the tilt and/or of the decenter of the optical element with regard to the reference axis and hence with regard to the measurement head can be reached. Subsequently and after having eliminated or at least reduced at least one of the tilt and the decenter a high precision topology measurement of the measurement surface can be conducted.

With some embodiments, the high precision topology measurement can be conducted by rotating the optical element with the reference axis as an axis of rotation while moving the measurement head of the interferometric measuring device in a transverse and longitudinal direction, wherein the longitudinal direction extends along or parallel to the axis of rotation and wherein the transverse direction extends perpendicular to the longitudinal direction. Here, the measurement surface of the optical element can be scanned or probed at numerous measurement points on the measurement surface.

In addition, the measurement head can be or is aligned towards a respective measurement point on the measurement surface of the optical element, such that a measurement beam portion is reflected from the measurement point on the measurement surface towards the measurement head. Typically, the measurement beam is directed substantially parallel to or along a surface normal in the region of the measurement point of the measurement surface.

Suitable examples of a high precision topology measurement are described in greater detail in US 2017/0082521 A1 or DE 10 2011 011 065 A1.

With the present method of measuring a surface, and preferably after having determined at least one of the tilt and the decenter and preferably after having aligned the optical element with regard to the reference axis so as to eliminate or to minimize tilt and/or a decenter a high precision topology measurement of the optical element can be conducted. Here, the measurement surface being subject to the high precision topology measurement can be one of the first surface and the second surface.

With some embodiments, the first surface might be a top surface of the optical element, which faces towards the measurement head. With some embodiments, the second surface might be a bottom surface of the optical element, which faces away from the measurement head. Here, a high precision topology measurement may be conducted through the optical element. The measurement beam emanating from the measurement head may hit a first target point on the first measurement surface. The measurement beam may then propagate through the optical medium and may be reflected at the first measurement point on the second surface of the optical element. From there, a measurement beam portion, typically reflected at the first measurement point returns through the optical element towards the first target point and back towards and/or into the measurement head.

Here, the optical phase of the returned measurement beam portion can be or is correlated and/or compared with the optical phase of a reference beam, e.g. generated by or in the measurement head. In this way, the topology of the first surface and/or of the second surface can be measured with interferometric precision without the necessity to rearrange, to reorient or to move the optical element with regard to a mount configured for holding the optical element.

Hence, in a first step, at least one of the tilt and decenter of the first surface can be determined. In a second step, the tilt and decenter of the first surface can be substantially eliminated through a respective adjustment of the optical element relative to the reference axis and/or relative to the measurement head. In a further step, a high precision topology measurement of the first surface can be conducted.

Thereafter or in an alternating sequence with the above steps also at least one of the way, also at least one of the tilt and the decenter of the second surface of the optical element can be determined by a respective measurement through the optical element. Here, and in a further step, the tilt and decenter of the second surface can be substantially eliminated through a respective adjustment of the optical element relative to the respective reference axis and/or relative to the measurement head.

In a further step, a high precision topology measurement of the second surface can be conducted by propagating the measurement beam through the optical element. Hence, a high precision measurement of the second surface of the optical element can be provided by scanning through the optical element from the first surface. In effect, a high precision topology measurement of the first surface and of the oppositely located second surface can be conducted without reorienting the optical element with regard to the measurement head.

In another aspect the present invention provides a measuring device for measuring a surface and/or profile of an optical element. The measuring device may be implemented as a non-contact optical measuring device configured to scan the respective surface of the optical element. With some examples the measuring device is an interferometric measuring device configured to direct a measurement beam onto the surface of the optical element and to detect a beam portion reflected from the surface of the optical element.

The measuring device comprises a light source configured to generate and to direct a measurement beam onto the measurement surface of the optical element. The measuring device further comprises a mount to fix the optical element. The measuring device further comprises a measurement head connected to the light source. The measurement head being configured to direct the measurement beam onto the measurement surface of the optical element. The measurement head may be further configured to receive a measurement beam portion reflected from the measurement surface.

The measurement head is further movable relative to the mount to direct the measurement beam at least onto a predefined first measurement point, onto at least a second predefined measurement point and onto at least a predefined third measurement point of the measurement surface.

The measuring device further comprises a detector connected to the measurement head and configured to detect the respective measurement beam portions reflected at least at the first measurement point, at least at the second measurement point and at least at the third measurement point.

The measuring device further comprises a signal analyzer connected to the detector and configured to determine a first position of the first measurement point, a second position of the second measurement point and to determine at least a third position of the third measurement point. The signal analyzer is further configured to determine at least one of a decenter and a tilt of the measurement surface relative to a reference axis. This determination is based on at least the first position, the second position and the third position of respective first, second and third measurement points of the measurement surface.

Typically, the measuring device is particularly configured to conduct the above described method of measuring a surface and/or of a profile of an optical element. Insofar, any features, examples and effects as described above in connection with the method equally apply to the present measuring device; and vice versa.

For measuring or for determining at least one of a decenter and a tilt of the measurement surface the signal analyzer is configured to conduct a numerical fitting procedure on the basis of the measured first, second and third positions of respective first, second and third measurement points. The measured positions are compared to predefined positions of the optical element, whose profile and geometry is at least known to a minimum degree of precision. Based on the numerical fitting of the measured first, second and third position with predefined reference geometry of the optical element at least one of the decenter and the tilt of the respective measurement surface relative to the reference axis can be determined.

The determination of at least one of the decenter and the tilt of the measurement surface includes and/or provides a degree of decenter and/or tilt relative to the reference axis. In this way, the at least one of the decenter and the tilt determined by the signal analyzer can be further used to properly align or to adjust the optical element relative to the reference axis. This adjustment or calibration can be conducted manually or automatically. When conducted manually, the entire procedure of measuring first, second and third measurement points and deriving of respective first, second and third positions can be repeated one or multiple times to repeatedly obtain the respective decenter and tilt of the measurement surface of the optical element.

With some embodiments, the adjustment of the optical element and hence the alignment of the measurement surface of the optical element towards the reference axis, e.g. by reducing the decenter and/or the tilts to a minimum can be also conducted automatically and/or deterministically. By precisely measuring the degree or size of decenter and/or tilt the interferometric measuring device, e.g. a controller of the measuring device may automatically adjust the position and/or orientation of the mount of the optical element so as to eliminate or to at least reduce the decenter and/or the tilt of the measurement surface relative to the reference axis.

According to a further embodiment, the mount is arranged on a rotatable, hence rotary measurement stage. The rotary measurement stage may define the reference axis. At least one of a radial position of the mount and an orientation of the mount relative to the reference axis is adjustable. Adjusting of the radial position of the mount and/or adjusting an orientation of the mount may be conducted manually. With some embodiments the rotary measurement stage and/or the mount may be provided with at least one or several electromechanical actuators by way of which the radial position and/or the orientation of the mount relative to the reference axis can be adjusted automatically. In this way, a rather precise and fast alignment of the mount and hence of the optical element attached to the mound can be provided.

According to another embodiment, the measuring device comprises a controller operable to adjust at least one of a radial position of the mount at an orientation of the mount relative to the reference axis on the basis of at least one of the decenter and the tilt of the measurement surface. Here, the controller is particularly configured and adapted to control operation or actuation of at least one of the actuators of the rotary measurement stage or of the respective mount in order to move or to oriented the mount and/or of the optical element into a predefined position and/or orientation relative to the reference axis. In this way, a quasi-automated and measurement-based decenter adjustment and tilt adjustment of the optical element relative to the reference axis can be provided.

Typically and with a further embodiment the operation of the controller during adjusting of at least one of a radial position of the mount and an orientation of the mount relative to the reference axis can be monitored or controlled by the measurement head. Hence, during the adjustment of at least one of the radial position and the orientation of the mount the measurement head may be used to control the position of at least one of the mount and the optical element attached to the mount. In this way a feedback loop can be provided to provide a further control of the controller during the adjustment or calibration of the mount.

In effect, a rather precise and fast alignment and/or positioning of the mount and/or of the optical element relative to the reference axis can be provided. This is of particular benefit to reduce a cycle time or clock cycle for a sequential measuring of surfaces or profiles of a multitude of optical elements. With a quasi-automated alignment and adjustment of the mount a subsequent high precision measurement of the profile and/or surface of the optical element can be provided.

Moreover, a reduced cycle time or clock cycle for the adjustment is beneficial for a use of the measuring device for the quality control of mass-manufactured optical elements.

According to another embodiment, the measuring device further comprises a measurement head controller. The measurement head controller is operable to move and/or to align the measurement head relative to the amount and/or relative to the reference axis. For measuring of the distance to at least the first measurement point, to at least the second measurement point and to at least the third measurement point of the measurement surface facing away from the measurement head, the measurement head controller is configured to determine at least a first target point, a second target point and a third target point of one of the first surface and the second surface of the optical element which is located opposite to the measurement surface and which is facing towards the measurement head.

Each one of the first, the second and the third target points correlates with one of the first, the second and the third measurement points such that the measurement beam entering the medium of the optical element at the first target point, at the second target point and at the third target point is internally retroreflected at the first measurement point, the second measurement point and the third measurement point, respectively.

Typically, the first target point is directly correlated to the first measurement point. The second target point is correlated to the second measurement point and the at least third target point is correlated to the third measurement point. After having determined the first target point, the second target point and the at least third target point the measurement head controller is configured to direct or to oriented the measurement head in such a way that the measurement beam emanating from the measurement head is directed onto the respective first target point, the second target point and the at least third target point in order to provide a measurement of the position of the correlated first measurement point, the second measurement point and the at least third measurement point.

In a further embodiment, the measuring device is also configured to conduct a high precision scanning of the surface and/or profile of the optical element after having aligned the optical element with regard to the reference axis.

During the scanning or measuring of the surface and/or profile of the optical element, the measurement head controller is moved relative to the optical element such that the measurement beam is directed substantially perpendicularly on the measurement surface of the optical element.

According to another aspect the invention further provides a computer program comprising instructions which, when executed by a processor of a measuring device as described above, causes the processor to carry out the steps of the method as described above. Insofar, all features, effects and benefits described above with regards to the method of measuring a surface and/or profile of an optical element as well as described with regards to the measuring device equally apply to the computer program; and vice versa.

The computer program may be implemented in a processor of the signal analyzer of the measuring device and/or in a processor of the measurement head controller. The computer program may be a distributed computer program. Parts of the computer program may be implemented or deployed in a processor of the signal analyzer. Other parts of the computer program may be implemented or deployed in a processor of the measurement head controller.

BRIEF DESCRIPTION OF THE DRAWING
FIGURES

In the following detailed description of the invention, numerous embodiments of the method of measuring a surface and/or profile of an optical element as well as an interferometric measuring device for measuring such a surface or profile are described in greater detail by making reference to the accompanying drawing figures.

DETAILED DESCRIPTION OF THE
INVENTION

Figure 1:
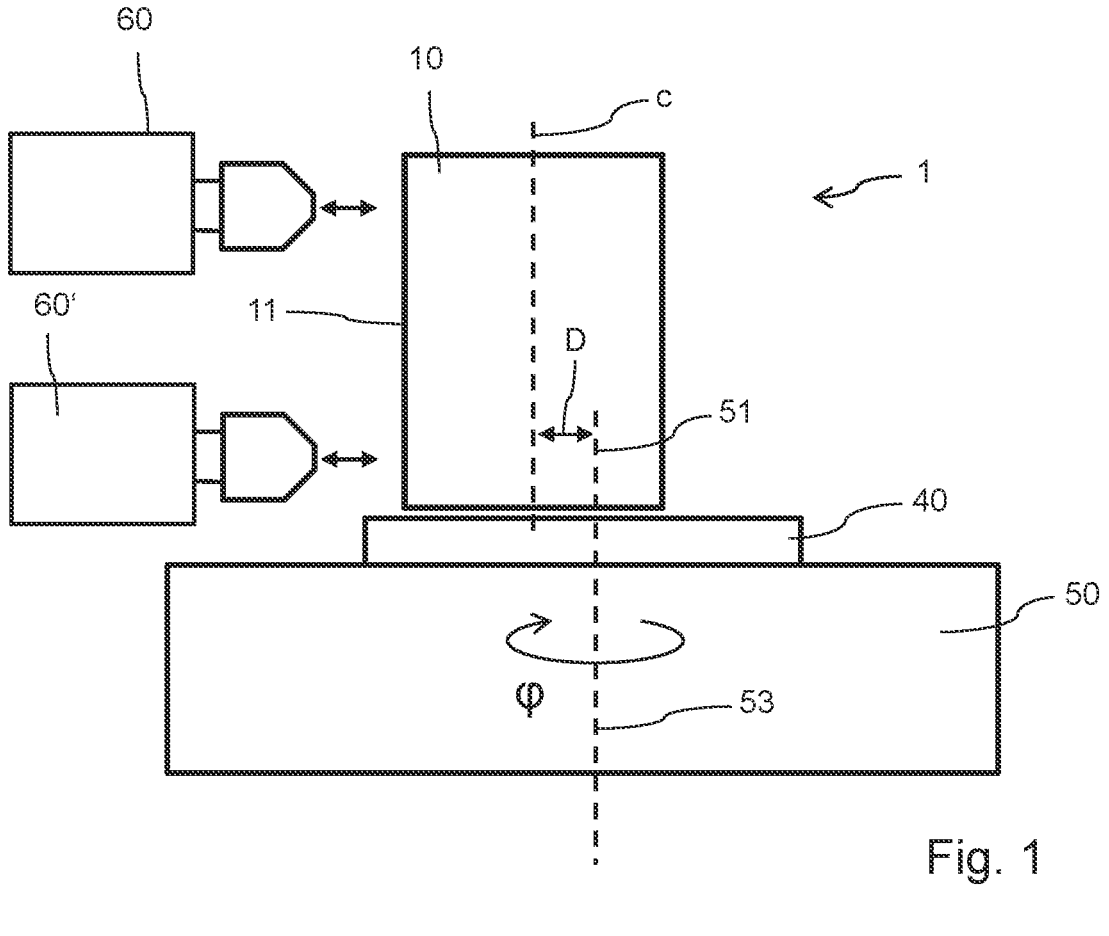
FIG. 1 schematically illustrates measuring of a surface or profile of an optical element to determine a decenter of the optical element relative to a reference axis.

In FIG. 1 there is illustrated a simplified embodiment of a measurement device 1 operable to measure at least one of a decenter D and a tilt of an optical element 10 relative to a reference axis 51. There is provided a rotary measurement stage 50 defining the reference axis 51. The reference axis 51 may coincide with an axis of rotation 53. On top of the measurement stage 50 there is provided a mount 40 for an optical element 10, e.g. a lens. The mount 40 is rotatable on the measurement stage 50 with the reference axis 51 or the rotation axis 53 as an axis of rotation. There is further provided an optical element 10. The optical element 10 features a measurement surface 11. Only for the purpose of a simple illustration, the optical element 10 is a cylindrical object and features a cylindrical sidewall as a measurement surface 11.

The optical element 10 comprises an optical axis c. The measurement device 1 comprises at least one measurement head 60. The measurement head 60 is configured to measure a distance to the measurement surface 11 as the measurement stage 50 is set into rotation so as to move the mount 40 together with the optical element 10 with the reference axis 51 as an axis of rotation. The measurement stage 50 rotates the mount 40 and the optical element 10 with regard to the reference axis 51 as an axis of rotation. As illustrated in FIG. 1, the optical axis c of the optical element 10 is located at a radial decenter D from the reference axis 51.

In FIG. 1 the measurement head 60 may be moved from an upper position to a lower position of the measurement head 60'. Then, for measuring of a tilt T or decenter D of the optical element 10 the measurement head 60 determines a distance to the measurement surface 11 at a first position of the measurement head 60 along the optical axis c and at a second position of the measurement head 60' along the optical axis c.

Figure 2:
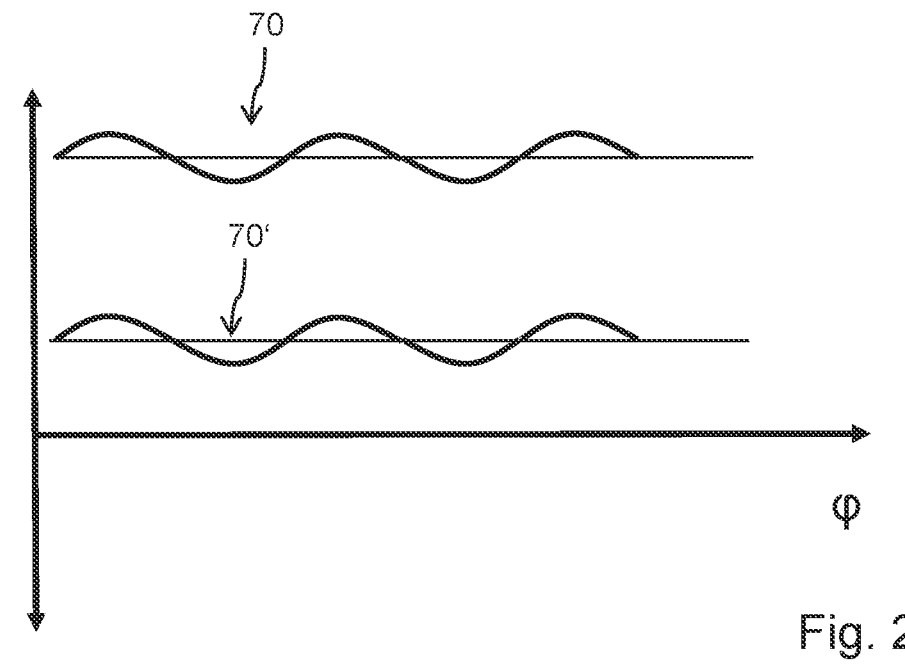
FIG. 2 shows a diagram of measured distances in accordance to the arrangement of FIG. 1.

In FIG. 2, the distance D measured by the measurement head 60 to the measurement surface 11 is illustrated as a graph 70 over the angle of rotation φ of the rotary measurement stage 50. The measured distance of the measurement head 60' is represented by the graph 70'. Since the geometric center and hence since the optical axis c is located at a radial offset D from the reference axis 51 or from the axis of rotation 53 the distances according to the graphs 70, 70' exhibits an undulation over the rotation angle cp. Since the central axis or the optical axis c of the optical element 10 is parallel to the axis of rotation 51 and since the measurement surface 11 is cylindrical and comprises a constant diameter along the elongation of the optical axis c the slope and the amplitude of the graphs 70, 70' is substantially equal. The amplitude of the graphs 70, 70' is a direct measure of the decenter D of the optical axis c and the reference axis 51.

Figures 3, 4:
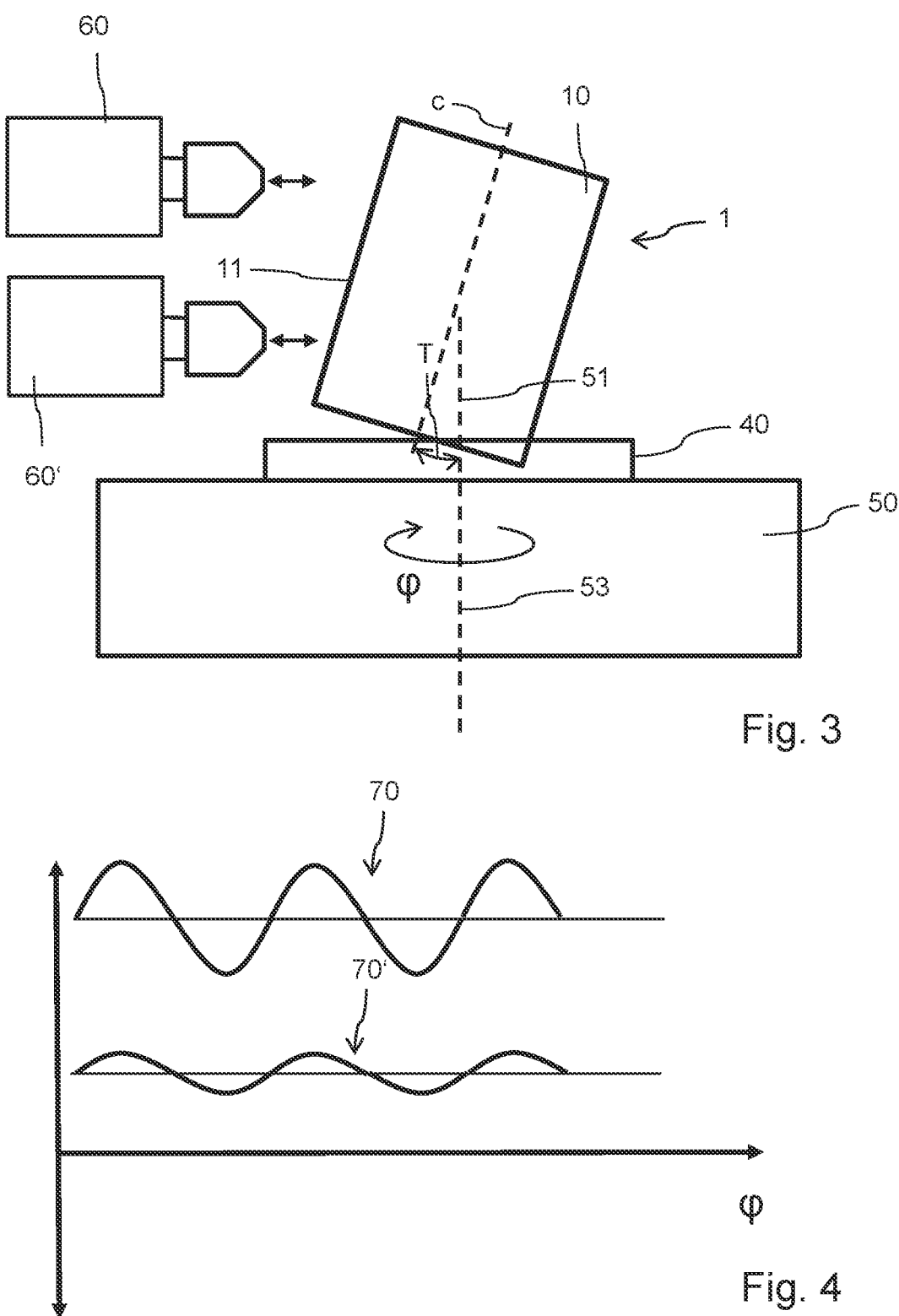
FIG. 3 shows a further embodiment similar to FIG. 1, wherein the optical element is decentered and tilted compared to a reference axis.
FIG. 4 shows a diagram of measured distances of the arrangement in accordance to FIG. 3.

The situation changes as the optical element 10 is skewed or tilted with respect to the reference axis 51 or axis of rotation 53. Accordingly, the amplitude of the undulation of the graph 70 as measured in the position of the measurement head 60 differ from the undulations or amplitude of the graph 70' as measured in the further position of the measurement head 60' as illustrated in FIGS. 3 and 4.

From the variations of the amplitude and/or undulations of the graphs 70, 70' at least one of a decenter D and a tilt angle T of the optical axis c relative to the reference axis 51 can be determined.

Generally, when the geometry of the optical element 10 is known at least to a minimum degree of precision and by the measurement point on the measurement surface 11 of the optical element 10 are well-defined the tilt of the measurement surface 11 as well as the decenter D of the measurement surface 11 relative to the reference axis 51 can be obtained through numerical analysis. This can be obtained e.g. by fitting actually measured positions of dedicated measurement points on the measurement surface 11 to well-known and predefined reference points of the optical element 10.

Figure 5:
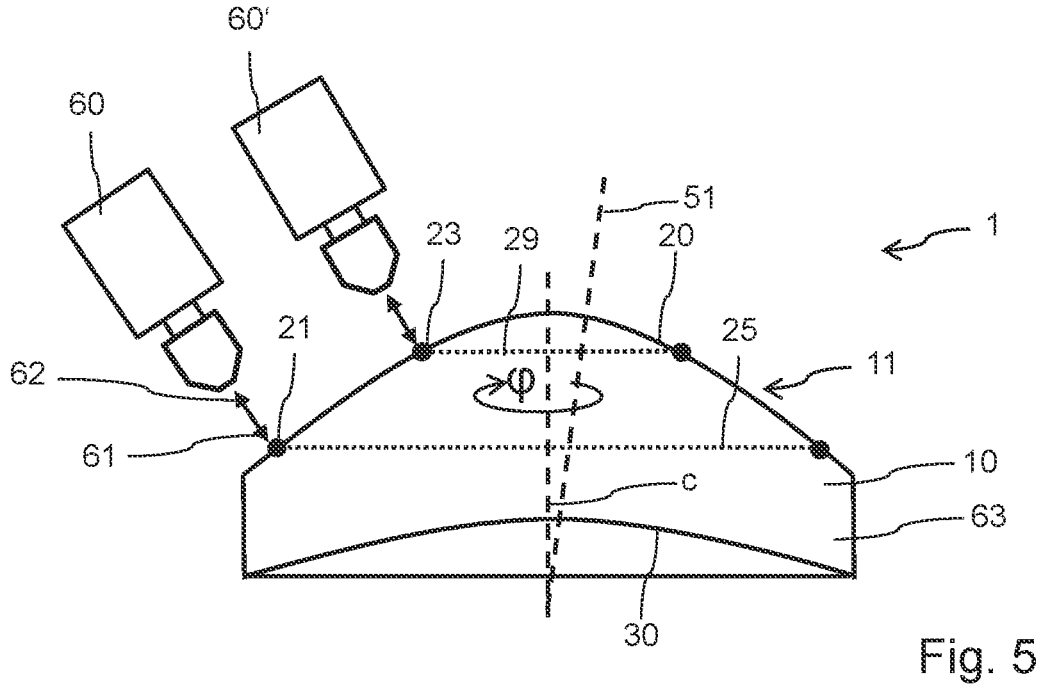
FIG. 5 shows an embodiment of measuring at least a first, a second and a third measurement point on a measurement surface of an optical element as seen from the side.
Figure 6:
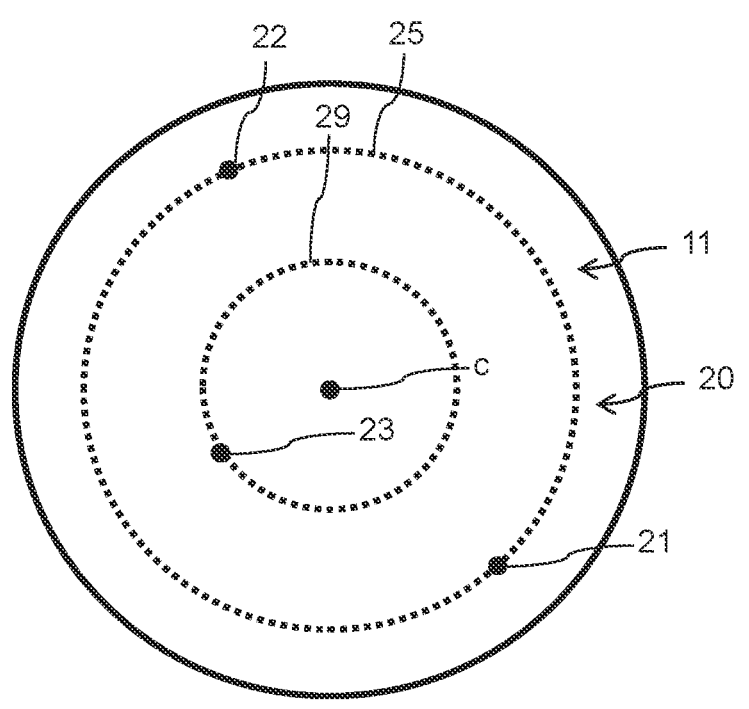
FIG. 6 shows the embodiment of FIG. 5 as seen from the top.

Determining of decenter D and/or tilt T in a more generic and general case is illustrated in FIGS. 5 and 6.

In the side view of FIG. 5 and in the top view of FIG. 6 three dedicated and predefined measurement points 21, 22, 23 are illustrated. The measurement points 21, 22, 23 all have a certain radial offset from the central axis or optical axis c of the optical element 10. The optical element 10 comprises a first surface 20 and an oppositely located second surface 30. In the illustrated embodiment the optical element 10 may comprise an optical lens with an upper surface 20 and a lower surface 30. The optical element 10 is made of an optical medium 63 transparent for electromagnetic radiation.

On the first surface 20 currently considered as a measurement surface 11 there are provided three dedicated measurement points 21, 22, 23. These points 21, 22, 23 are fixed. They may be virtually defined on the measurement surface 11. They may be defined in a mathematical model of the optical element 10. They may be identified or defined in view of the overall geometry, e.g. in view of the circumferential border of one of the first surface 20 and/or of the second surface 30, respectively.

When the first surface 20 and hence the measurement surface 11 is a spherical surface it is generally sufficient to define at least three measurement points 21, 22, 23 on the measurement surface 11. The measurement head 60 is then used to measure the first position of the first measurement point 21, the second position of the second measurement point 22 and the third position of the third measurement points 23.

Respective position measurements are obtained by directing a measurement beam 61 from the measurement head 60 onto e.g. the first measurement point 21. A beam portion 62 of the measurement beam 61 reflected at the first measurement point 21 is captured by the measurement head 60 and is detected. The measurement of the first position may include measuring of a distance between the measurement head 60 and the first measurement point 21.

When the measuring device 1 is implemented as an interferometric measurement device the measurement head 60 may be configured to determine a path difference of the reflected measurement beam portion 62 compared to a reference beam. A phase shift between the reflected measurement beam portion 62 and the reference beam may be indicative of the distance between the measurement head 60 and the first measurement point 21. The position and/or the orientation of the measurement head 60 in a global coordinate system, e.g. of a measurement device 1 is precisely known.

Measuring the distance between the measuring head 60 and the first measurement point 21 therefore allows to determine the position of the first reference point 21 in the global coordinate system of the measurement device 1.

In a similar way also the second position of the second measurement point 22 and the third position of the third measurement points 23 is obtainable. For this, the measurement head 60 is subject to a respective movement towards the position 60' as indicated in FIG. 5. In addition, the optical element 10 may be subject to a rotation with regard to the reference axis 51.

After having measured at least the first position, the second position and the third position of the at least first, second and third measurement points 21, 22, 23, the orientation and position of the respective measurement surface 11 relative to a reference surface of the optical element 10 can be calculated and determined, typically through a numerical fitting operation. The numerical fitting operation is implemented by a computer program. Here, the program is provided with the construction details, and/or the geometric data of the optical element 10. The geometric data of the optical element 10 may be stored in the computer program as a reference optical element perfectly aligned with the reference axis 51. Now, by fitting the at least first, second and third positions actually measured with the measuring head 60, 60' into the numerical model of a reference optical element or reference measurement surface a decenter D and/or a tilt angle T of the measurement surface 11 compared to the respective reference surface or reference axis can be determined numerically.

Figure 22:
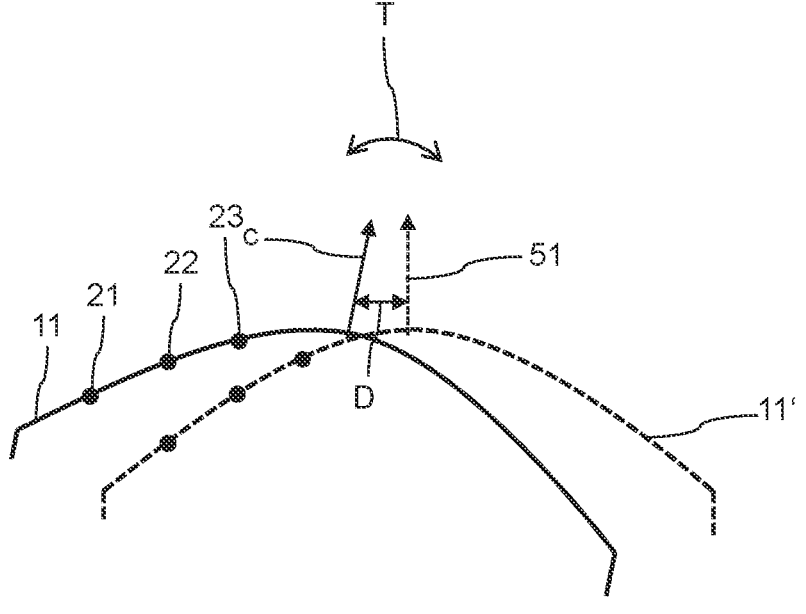
FIG. 22 schematically illustrates a numerical fitting procedure to obtain decenter and tilt of a measurement surface.

In FIG. 22 a determination of the decenter D and tilt T of a measurement surface 11 on the basis of a numerical fitting to a reference surface 11' is visualized. There, the axial position of the optical element 10 with first, second and third measurement points 21, 22, 23 on the measurement surface 11 is schematically illustrated. Since the overall shape and geometry of the optical element 10 is known at least to a minimum degree of precision on the basis of the position measurement of the at least three measurement points 21, 22, 23 the orientation and position of the measurement surface 11 can be characterized and determined by a numerical fitting procedure.

There is further illustrated a reference surface 11' of a reference optical element 10' in dashed lines. The reference optical element 10' represents the position and orientation of the optical element 10 if it where perfectly aligned for the subsequent high precision surface measurement procedure. The first, second and third positions of the at least first, second and third measurement points 21, 22, 23 is numerically fitted in the mathematical model with the decenter D and the tilt angle T as variables. The measured positions of the at least first, second and third measurement points 21, 22, 23 is numerically fitted to minimize the deviations from the reference surface 11'. This leads to a numerical determination of a respective tilt angle T and respective radial decenter D.

In this way and by probing at least a first, a second and a third position of dedicated and predefined first, second and third measurement points 21, 22, 23 on a measurement surface 11 of an optical element 10 the decenter D and/or the tilt T of the measurement surface 11 compared to a reference axis 51 can be determined. Making use of only three separated measurement points 21, 22, 23 may be sufficient for a measurement surface 11 of spherical shape. If the measurement surface 11 comprises an aspheric shape there are required at least five dedicated and predefined measurement points on the measurement surface. In case of a free-form surface of the measurement surface there are required at least six dedicated and/or predefined measurement points 21, 22, 23.

In the present embodiment there may be provided a first measurement path 25 and a second measurement path 29 on the measurement surface 11. With the presently illustrated embodiment, both measurement paths 25, 29 are closed measurement paths. The first measurement path 25 may comprise a circle or an oval on the measurement surface 11. Also, the second measurement path 29 may comprise a circle or an oval. As further illustrated, the first and the second measurement points 21, 22 are located on the first measurement path 25. Only the third measurement point 23 is located on the second measurement path 29.

By choosing or defining at least a first and a second measurement path 25, 29 on the measurement surface 11, and by making use of numerous measurement points on the at least two measurement paths 25, 29 the position of a comparatively large number of measurement points can be determined. The measurement head 60 may scan along the first measurement path 25 and/or along the second measurement path 29 and may thus determine the position of a respective number of measurement points on the measurement surface 11. Generally, the more positions of measurement points are obtained, the more precise can be the fitting procedure for determining at least one of the decenter D and the tilt T of the measurement surface 11 compared to the reference axis 51.

Figure 7:
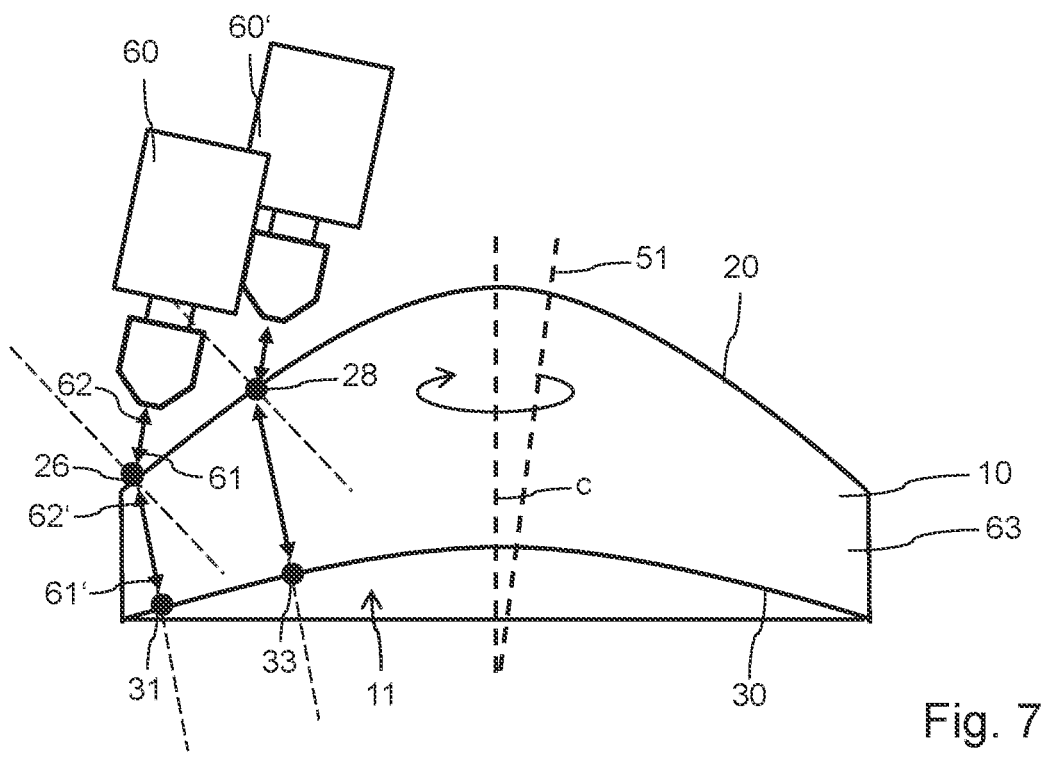
FIG. 7 is illustrative of a further embodiment, wherein the positions of at least three measurement points provided on a bottom surface of an optical element are measured from above the optical element as seen from the side.
Figure 8:
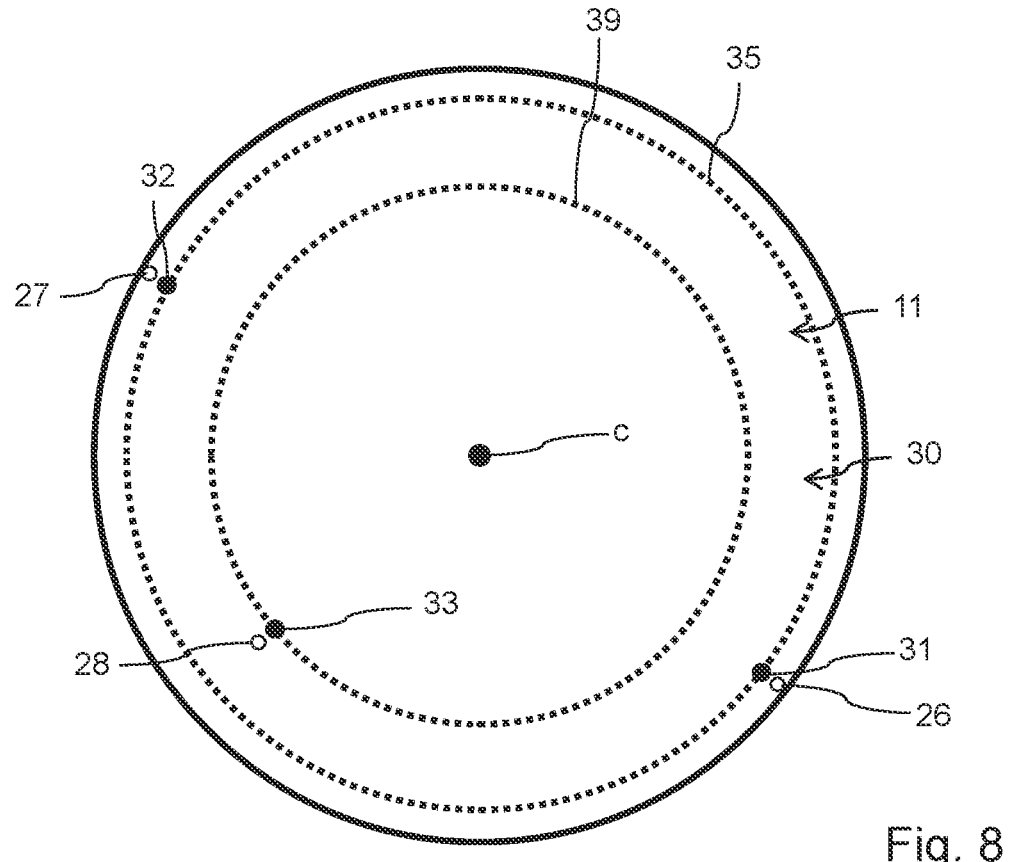
FIG. 8 shows the embodiment of FIG. 7 from the bottom.

In the embodiment of FIGS. 7 and 8 the second surface 30 of the optical element 10 is defined as the measurement surface 11 as illustrated in the bottom view of the optical element 10 and the measurement surface 11 is also provided with a first measurement point 31, a second measurement point 32 and a third measurement point 33. Also here, the first and the second measurement points 31, 32 are located on a first measurement path 35. The third measurement point 33 is located on a second measurement path 39.

The first and second measurement paths 25, 35, 29, 39 are concentric in the presently illustrated embodiments. However, they may also be non-concentric or may be skewed relative to each other. It is even conceivable, that measurement paths 25, 29, 35, 39 intersect each other.

For measuring the position of the first, second and third measurement point 31, 32, 33 the measurement head 60 is still located on the side of the first surface 20 of the optical element 10. As indicated in FIG. 7, the position measurement of the first, second and third measurement points 31, 32, 33 is conducted through the medium 63 of the optical element 10. In order to precisely measure the first position of the first measurement point 31, the second position of the second measurement point 32 and the third position of the third measurement point 33 there are defined respective first, second and third target points 26, 27, 28 on the opposite side, hence on the first surface 20 of the optical element 10. The first target point 26 is directly correlated to the first measurement point 31. The second target point 27 is directly correlated to the second measurement point 32 and the third target point 28 is directly correlated to the third measurement point 33.

Since measuring of the position of the numerous measurement points 31, 32, 33 and hence measuring of the distance between the measurement head 60, 60' to the measurement points 31, 32, 33 includes a propagation of the measurement beam 61 through the medium 63 the respective target points 26, 27, 28 are calculated and/or determined such that the measurement beam 61 directed onto the first target point 26 is refracted at the first target point in such a way that the refracted portion of the measurement beam 61' is retroreflected at the second surface 30 in the first measurement point 31. The retroreflected measurement beam portion 62' propagating through the medium 63 is then again subject to refraction at the first surface 20 and re-enters as the reflective measurement beam portion 62 the measurement head 60 in a direction opposite to the measurement beam 61.

Selection and determination of target points 26, 27, 28 is conducted on the basis of the refractive index of the medium 63, an angle of incidence of the measurement beam 61 on the respective target points 26, 27, 28. Moreover, selection and determination of the target point may also take into account the slope or surface profile of the region of the measurement points 31, 32, 33 and/or target points 26, 27, 28 as well as the thickness or profile of the optical element 10.

With some embodiments, determination of calculation of the target points 26, 27, 28 on the first surface 20, e.g. the surface facing towards the measurement head 60 may also take into account at least one of the position or orientation of the measurement head 60, 60'.

Moreover, for determining of the optical path length between the measurement head 60, 60' and the measurement points 31, 32, 33 on that surface 30 of the optical element 10 facing away from the measurement head 60, 60' the geometry of the optical path as well as the refractive index and the path length the beam propagates through the medium 63 is taken into account.

Since the refractive index of the medium 63 as well as the geometry and profile of the optical element 10 is known to a minimum degree of precision the position of the measurement points 31, 32, 33 can be determined at least for a sufficiently precise determination of a decenter D and/or tilt T of the respective measurement surface 11 relative to the reference axis 51.

Measuring of numerous measurement points 21, 22, 23 on a measurement surface 11 coinciding with the first surface 20 of the optical element 10 allows to determine at least one of a decenter D and a tilt T of the first surface 20 relative to the reference axis 51. This determination or measuring may constitute a first measurement procedure. Measuring of the first, second and third measurement points 31, 32, 33 of the second surface 30 of the optical element 10 constitutes a second measurement procedure. When switching from the first measurement procedure as illustrated in FIG. 5 to the second measurement procedure as illustrated in FIG. 7 the position of the optical element 10 of the mount 40 and/or on the measurement stage 50 may remain unamended.

Insofar, both measurement procedures conducted sequentially and one of which using the first surface 20 of the optical element as a measurement surface 11 and the other one of which using the second surface 30 of the optical element 10 as a measurement surface 11 are directly, hence inherently correlated to each other. The decenter D and tilt T of the first surface or 20 as obtained by the first measurement procedure can be directly correlated and mapped to a decenter D and tilt T of the second surface 30 as obtained through the second measurement procedure. A flipping or twisting of the mount 40 and/or optical element 10 for determining decenter D and tilt T of oppositely located surfaces 20, 30 of the optical element 10 is no longer required.

Hence, a direct mapping and assignment of geometric data and characteristics of oppositely located surfaces 20, 30 of an optical element 10 can be obtained without the necessity to the reorient or to flip the optical element 10 or the mount 40 between successive measurement procedures.

In the sequence of FIGS. 9-12 measuring of a thickness of the optical element 10 is schematically illustrated. For this, the measurement head 60 emitting the measurement beam 61 is aligned along the optical axis c of the optical element 10. This alignment can be made after having determined the decenter D and the tilt T of the optical element 10 relative to the reference axis 51. The measurement beam 60 is focused along the optical axis c.

Figure 10:
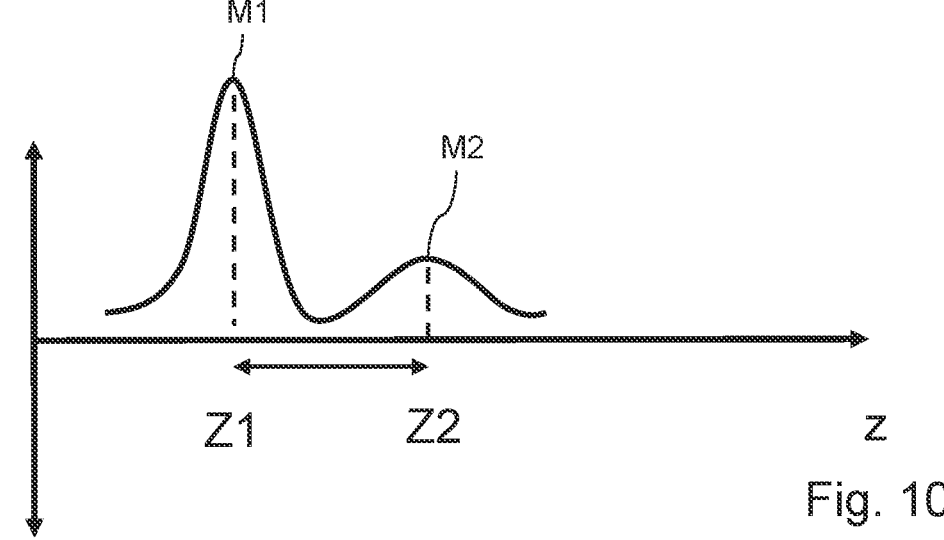
FIG. 10 shows a diagram of signal strength versus a longitudinal displacement of the measurement head along the optical axis for the embodiment of FIG. 9.
Figure 11:
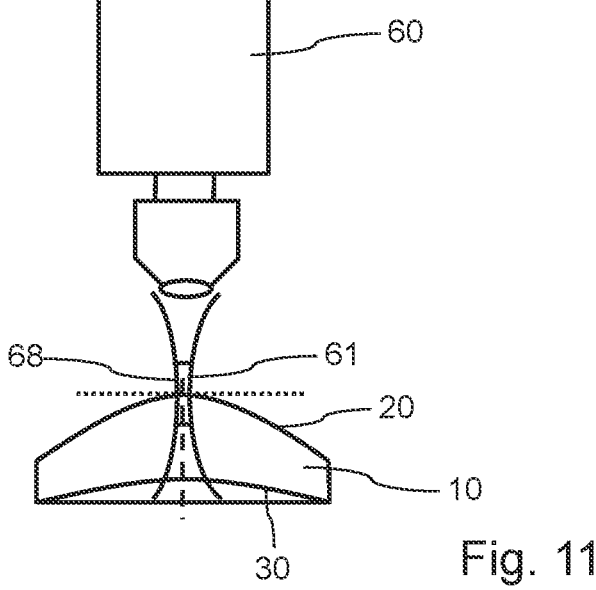
FIG. 11 shows a first configuration of the embodiment of FIG. 9, wherein the focal area of the measurement beam coincides with the first surface.

Now, the measurement head 60 can be moved with the focused measurement beam 61 along the optical axis c. As the focal area 68 of the focused measurement beam 61 coincides with the first surface 20 of the optical element 10 as illustrated in FIG. 11, the intensity or signal strength of the reflected beam portion 62 detected and/or captured by the measurement head 60 will be at a maximum M1 as indicated in FIG. 10. This maximum M1 is obtained when the measurement head 60 is in a first measurement position z1.

Figure 12:
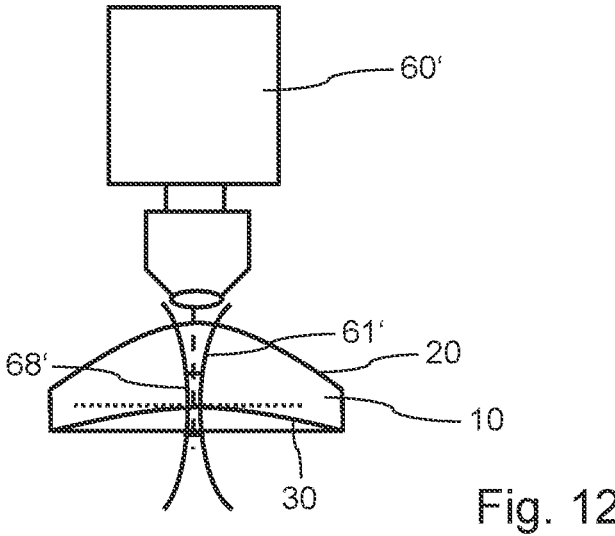
FIG. 12 shows the embodiment of FIG. 11, wherein the focal area of the focused measurement beam coincides with the second surface.

As the measurement head 60' is moved along the optical axis c, e.g. from the position as indicated in FIG. 11 towards the position as shown in FIG. 12 the focal area 68 of focal spot of the measurement beam 61' approaches the second surface 30 of the optical element. When the focal area 68' or focal spot coincides with the second surface 30, i.e. when the focal area 68 intersects the crossing of the optical axis c and the second surface 30, there arise a second maximum M2 of the captured and reflected measurement beam as indicated in FIG. 10. This maximum M2 is obtained when the measurement head 60' is in a second axial position z2.

The difference or distance between the positions z1 and z2 is directly indicative of the thickness of the optical element 10 along the optical axis c. For precisely determining of the thickness also the refractive index of the medium 63 is taken into account.

Figure 23:
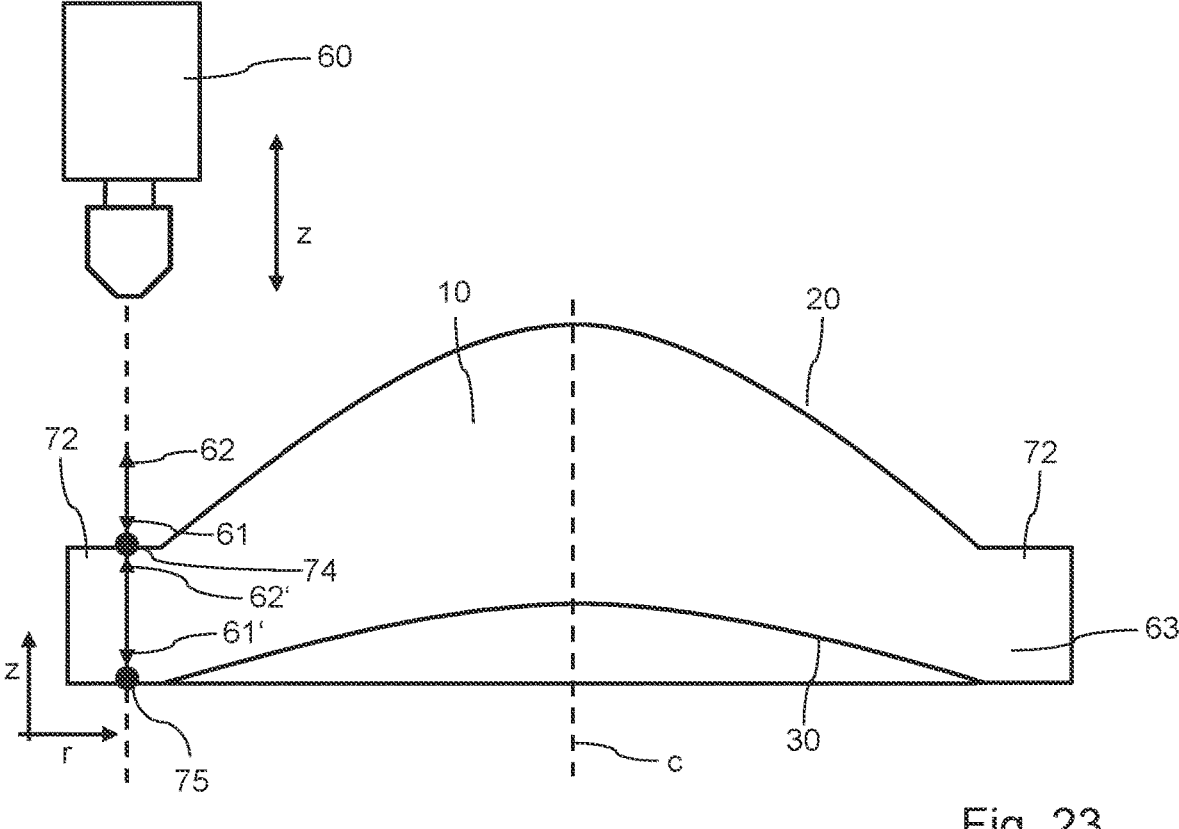
FIG. 23 schematically illustrates another embodiment of measuring a thickness of an optical element in an outer edge region.

In FIG. 23, another embodiment of measuring a thickness of an optical element 10 off-axis from the optical axis c but parallel to the optical axis c is illustrated. Here, the measurement beam 61 is directed onto an edge portion 72 of the optical element 10. Here, the edge portion 72 is a radial outer edge portion of the optical element 10, e.g. an optical lens. The first surface 20 and the second surface 30 in the edge portion 72 extend substantially parallel to each other. Here, the measurement beam 61 is directed parallel to the optical axis c onto a first measurement point 74 on the first surface 20 in the edge portion 72. At least a portion 61' of the measurement beam 61 is transmitted through the medium 63 and is retroreflected at an oppositely located second measurement point 75 on the second surface 30 in the edge portion 72. From there the reflected measurement beam portion 62' and 62 returns towards and into the measurement head 60.

As it is described above in connection with FIGS. 9-12 the position of the measurement head 60 is varied or moved along the direction of measurement beam propagation, typically along the optical axis c or parallel to the optical axis c so as to detect a local maximum of light intensity reflected at the first measurement point 74 and/or at the second measurement point 75, respectively.

In this way, the method of determining or measuring of the thickness of the optical element 10 is not limited to a measurement along the optical axis c. The above-described measurement can be applied to any region of an optical element, wherein a surface normal of a first point on the first surface extends substantially parallel to a surface normal of a second point on the oppositely located second surface. Typically, with optical lenses, this requirement is usually fulfilled in the region of the optical axis c.

Figure 13:
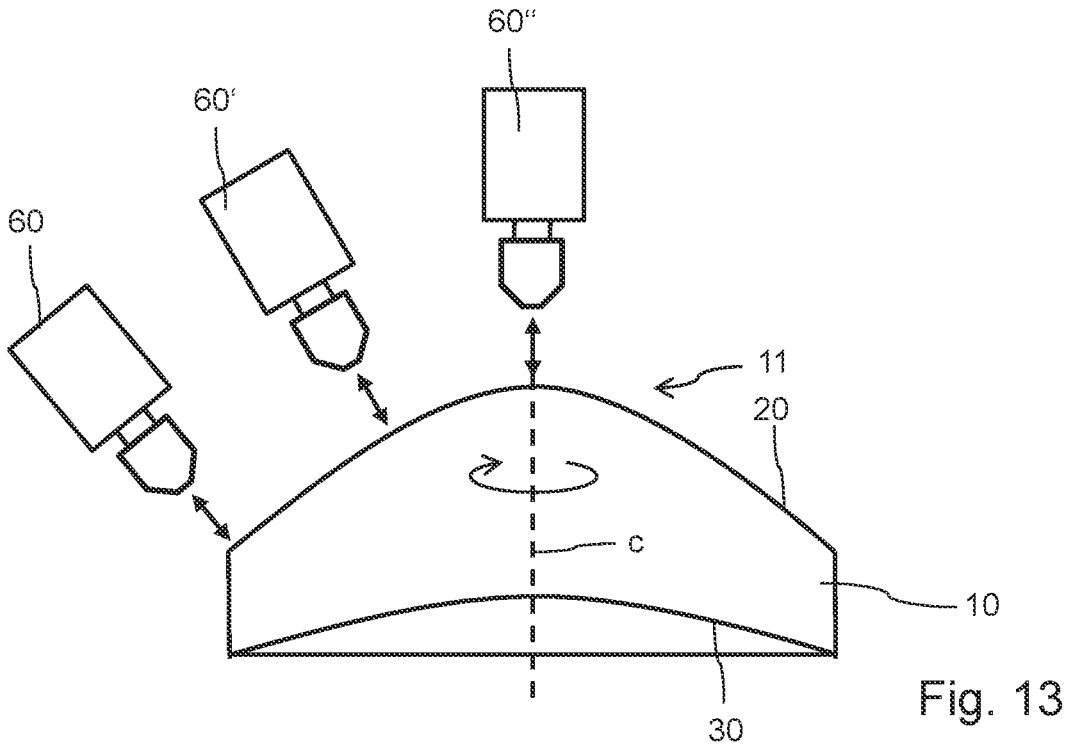
FIG. 13 shows a configuration of the measuring device during a high precision surface or profile scan of the first surface.

After having determined a decenter D and/or a tilt T of the measurement surface 11 relative to the reference axis 51, e.g. relative to an axis of rotation 53 of the measurement stage 50 the measurement surface 11, e.g. the first surface 20 can be precisely measured by scanning the measurement head 60 across the measurement surface 11 as indicated by numerous positions 60, 60' and 60" as illustrated in FIG. 13. This measurement of the surface is in close conformity to the measurement procedure as described in the documents US 2017/0082521 A1 or DE 10 2011 011 065 A1, the entirety of which are herein incorporated by reference.

Figure 14:
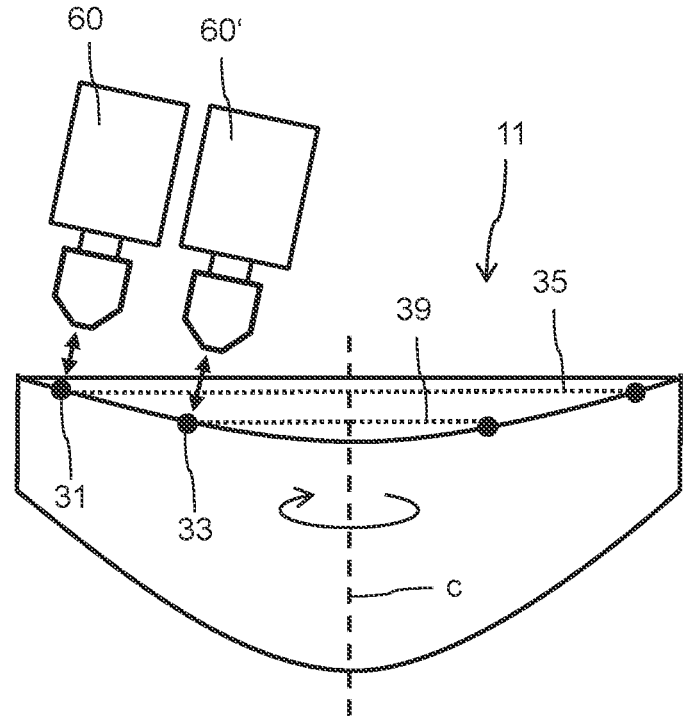
FIG. 14 shows a measurement of at least a first, a second and a third measurement point on the second surface of the optical element, wherein the optical element has been flipped over compared to the configuration of FIG. 5.

The embodiment as illustrated in FIG. 14 is somewhat equivalent to the embodiment as illustrated in FIG. 5 with the exception, that the optical element 10 has been flipped over so that the second surface 30 faces upwardly towards the measurement head 60. Here, the measurement surface 11 coincides with the second surface 30 and first, second and third measurement points 31, 32, 33 being located on the second surface 30 are measured and probed in the same way as described above with reference to FIG. 5.

After having determined at least one of the tilt T and the decenter D of the measurement surface 11 of the second surface 30 also here a high precision surface scanning or profile scanning of the second optical surface 30 can be conducted as described above in connection with FIG. 13.

Figures 15, 16:
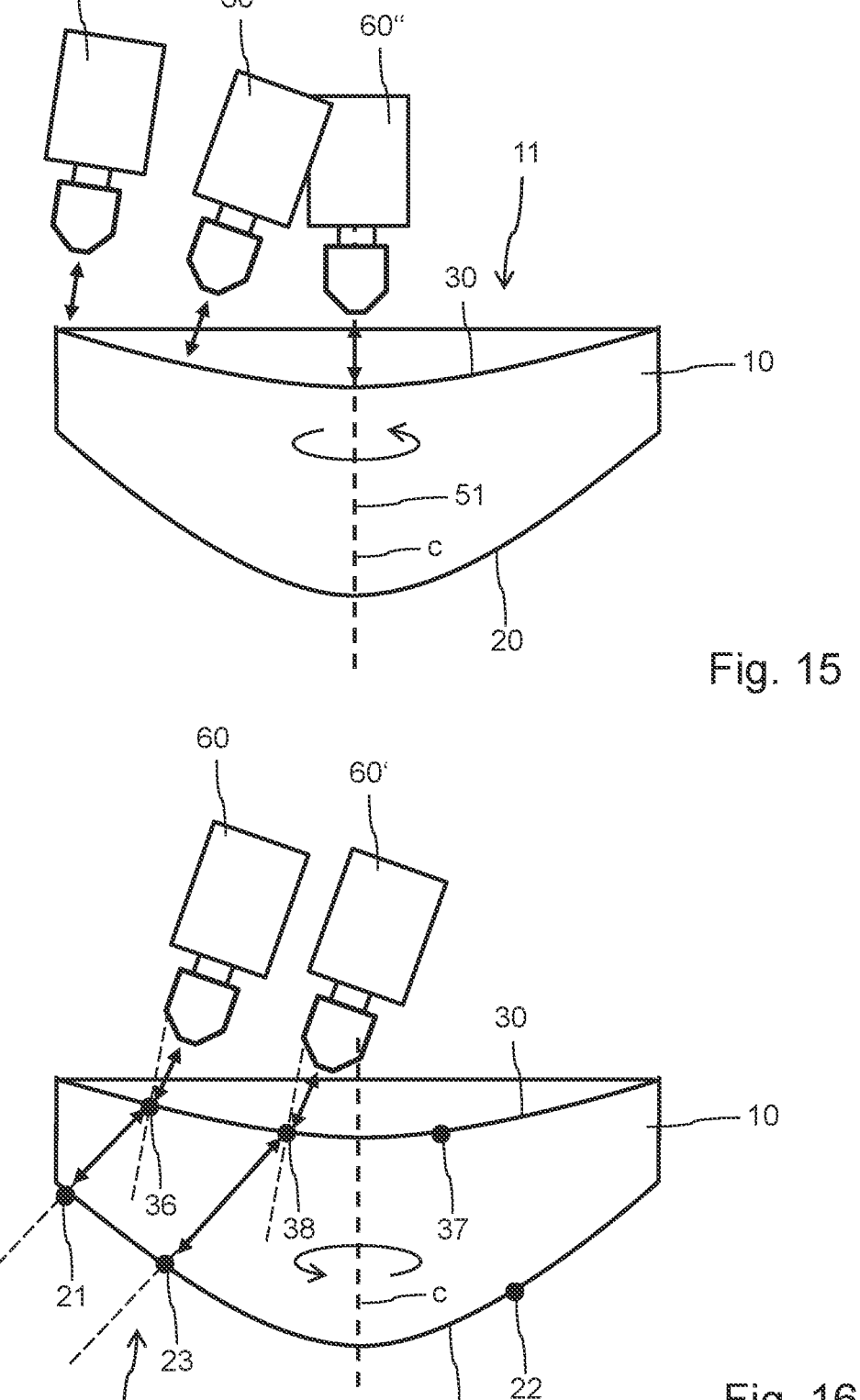
FIG. 15 shows a high precision surface measurement or profile measurement of the second surface in the configuration of FIG. 14, FIG. 16 schematically shows measuring of at least a first, a second and a third measurement point on the first surface through the second surface in the configuration of the optical element in accordance to FIGS. 14 and 15.

It is also possible and conceivable to define target points 36, 37, 38 on the second surface 30 as illustrated in FIG. 16. In this way, the measurement points 21, 22, 23 provided on the first surface 20, now facing away from the measurement head 60, can be measured. Hence, the positions of the first, second and third measurement points 21, 22, 23 of the first surface 20 can be measured through the medium 63 of the optical element 10 by defining respected first, second and third target points 36, 37, 38 on the upward facing second surface 30. In this way the measurement precision can be increased.

With a measurement procedure as illustrated in FIG. 5, at least one of the decenter D and tilt T of the first surface 20 can be determined directly. In the configuration of FIG. 16, the decenter D and/or the tilt T of the first surface 20 can be measured through the medium 63 and through definition of target point 36, 37, 38 on the oppositely located second surface 30. The determination of the decenter D and/or tilt T of the first surface 20 as obtained by the measurement procedure of FIG. 5 can be compared and correlated to the measurement of decenter D and/or tilt T as obtained by a measurement procedure in a configuration of the optical element 10 as illustrated in FIG. 16. In this way, decenter D and tilt T of both, the first surface 20 and of the second surface 30 can be measured in twofold and in two different ways, thus increasing the precision of the determination of the decenter D and/or the tilt T of the respective surfaces 20, 30 of the optical element 10.

Figure 17:
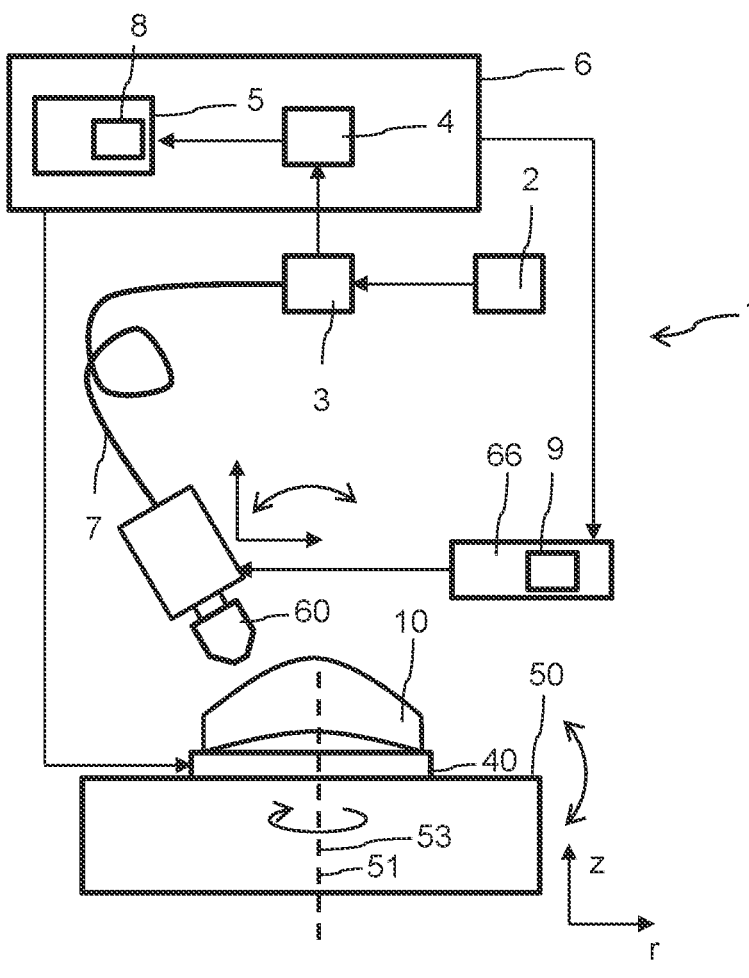
FIG. 17 is a block diagram of the measuring device.

In FIG. 17 one embodiment of the measurement device 1 is illustrated in a block diagram. The measurement device 1 comprises a light source 2, an optical coupler 3, a detector 4 and a measurement head 60. The measurement head 60 is optically coupled to the light source 2 through an optical fiber 7. A measurement beam 61 generated by the light source 2 may be directed to the measurement head 60 via the optical coupler 3 and the optical fiber 7. When the measurement device 1 is implemented as an interferometric measurement device the measurement beam 61 is split into a signal beam directed to the optical element 10 and a reference beam. With some embodiments, e.g. described in greater detail in at least one of the documents DE 10 2011 011 065 B4 or US 2017/0082521 A1.

The reference beam may be generated at a fiber exit face located inside the measurement head 60. A measurement beam portion 62 reflected from a surface 20, 30 of the optical element 10 is captured by the measurement head 60 and co-propagates with the reference beam in the optical fiber 7 towards the optical coupler 3. With typical examples, the optical coupling 3 comprises an optical circulator.

Light propagating from the measurement head 60 towards the optical coupler 3 is redirected towards the detector 4. The detector 4 comprises numerous light-sensitive elements, such as an array or matrix of charge coupled devices (CCD) in order to detect an interference pattern generated by the interference of the reference beam and the captured measurement beam portion 62 reflected on one of the surfaces 20, 30 of the optical element 10. The detector 4 is connected to a signal analyzer 5 in order to resolve and/or to determine a relative phase between the reflected signal beam and the reference beam.

Typically, the signal analyzer 5 comprises a processor 8 in order to calculate or to determine a relative phase, hence an optical path difference between the reflected signal beam and the reference beam obtained and/or captured by the measurement head 60. Based on the optical path difference a distance to selected points on the surface 20, 30 of the optical element 10 can be determined. With the further knowledge of the exact position of the measurement head 60 with regards to a global coordinate system of the measurement device 1, the position of the respective measurement points on the surface 20, 30 of the optical elements 10 can be obtained.

As described before, the optical element 10, e.g. in form of a lens is mounted on a mount 40. The mount 40 is rotationally supported on a rotary measurement stage 50. The measurement stage 50 defines a reference axis 51. The reference axis 51 may coincide with an axis of rotation 53 as defined by the measurement stage 50.

The measurement device 1 further comprises a measurement head controller 66. The measurement head controller 66 comprises at least a processor 9. The measurement head controller typically controls and governs a position as well as an orientation of the measurement head 60. The signal analyzer 5 and the detector 4 may be implemented as integrated components of a controller 6 of the measurement device 1. In this way the measurement head controller 66 may be also implemented as a component, e.g. as an integral component of the controller 6. The processors 8, 9 as illustrated here may be also integrated in a single processing unit of the controller 6.

The measurement head controller 66 may be also implemented as a separate controller. The controller 6 is configured to control or to communicate with the measurement head controller 66. In this way, the controller 6 is configured to determine the measurement points to be scanned on a surface 20, 30 of the optical element 10 and to assign the measurement beam portions 62 captured from the respective measurement points to respective measurement points on the surface 20, 30.

With some embodiments the mount 40 may be controllable by the controller 6. Hence, the controller 6 may be configured to orient or to move the mount 40 and hence the optical element 10 relative to the reference axis 51. In this way, the controller 6 may be configured to automatically adjust a decenter D and/or a tilt T of the optical element 10 relative to the reference axis 51. The present embodiments are described in the basis of cylindrical coordinates. Since the mount 40 is rotatable relative to the axis of rotation 53 and hence relative to the reference axis 51 while the mount 40 is displaceable in radial direction relative to the stationary measurement stage 50. The mount 40 may be also tiltable at least with regards to a first tilt axis a and with regards to a second tilt axis b. Tilt axes a, b may extend in a plane perpendicular to the reference axis 51 or perpendicular to the axis of rotation 53. The tilt axis a, b may be stationary with regard to the mount 40. With some embodiments, the tilt axis a, b may be reconfigurable. Hence, the position and/or orientation of the tilt axis a, b may vary.

Figure 18:
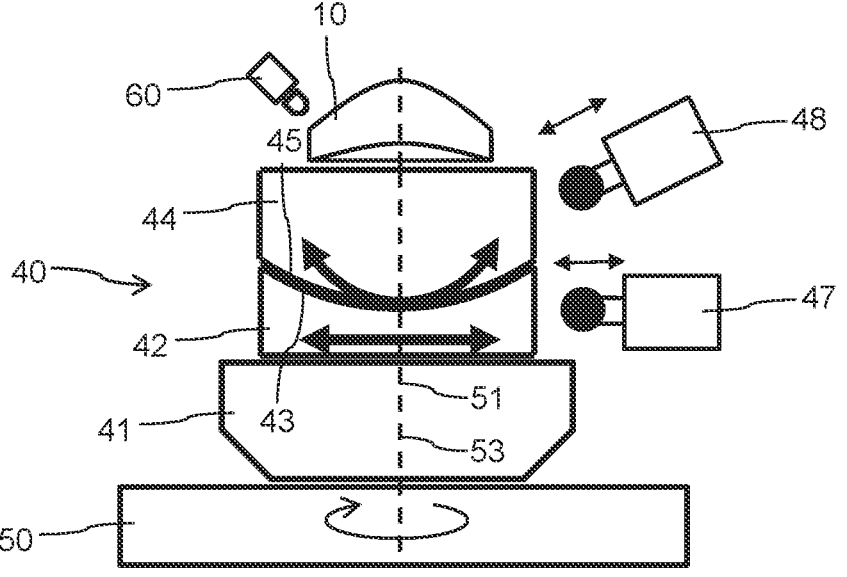
FIG. 18 shows one embodiment of an adjustable mount for the optical element arranged on a rotary measurement stage.
Figure 19:
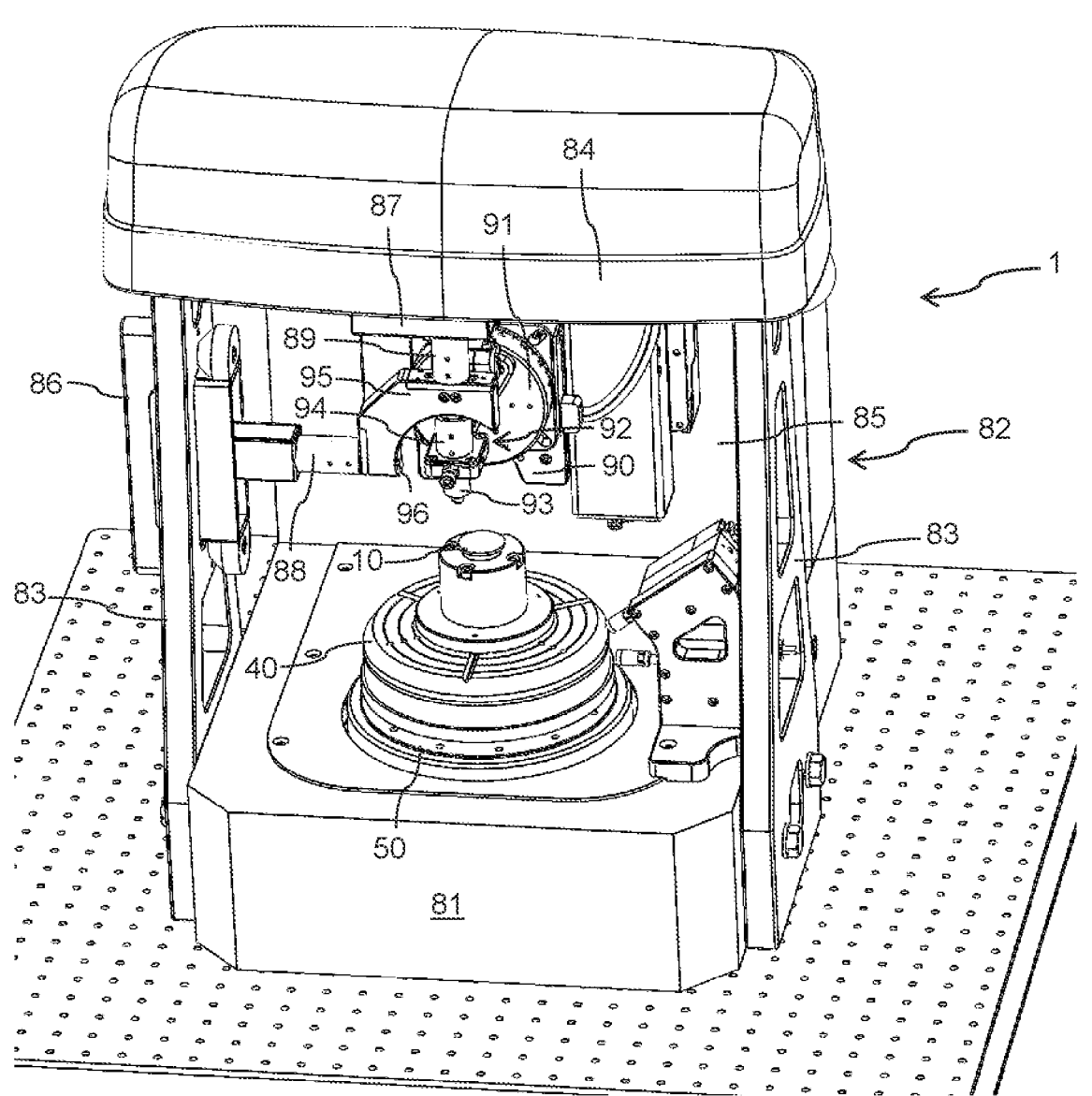
FIG. 19 is a detailed illustration of one embodiment of the interferometric measuring device.
Figure 20:
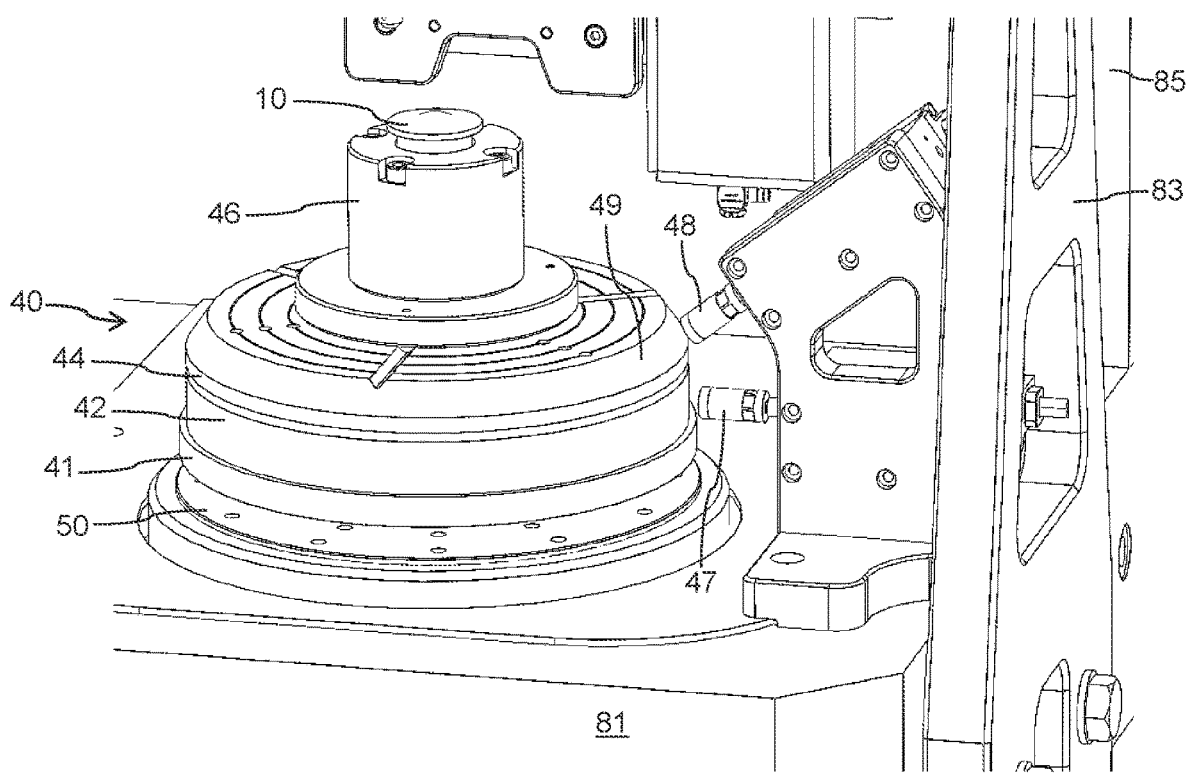
FIG. 20 shows some details of the interferometric measuring device of FIG. 19 in an enlarged view.

In the embodiment of FIGS. 18-20, the mount 40 comprises a base 41 fixable to the measurement stage 50. On an upper surface of the base 41 there is located and positioned an intermediate part 42. On an upper surface 43 of the intermediate part 42 there is provided an upper part 44. The intermediate part 42 is somewhat loosely fitted on an upper surface of the base 41. It may be in frictional engagement with the upper surface of the base 41. A lower or bottom surface of the intermediate part 42 may be planar shaped and may be in surface contact with a complementary planar-shaped upper surface of the base 41.

In that way and since the reference axis 51 or axis of rotation 53 extends substantially perpendicularly through the planar-shaped surfaces of the intermediate part 42 and the base 41 the intermediate part 42 is displaceable relative to the base 41 along the radial direction r indicated in FIG.

17. The intermediate part 41 is displaceable in the radial direction r through an actuator 47. The actuator 47 may comprise a kind of a mechanical pulse generator or pulsing device configured to apply a force in the radial direction r onto the intermediate part 42. In this way, the intermediate part 42 can become subject to a radial shifting relative to the base 41.

An upper surface 43 of the intermediate part 42 is dome-shaped. A lower surface 45 of the upper part 44 is complementary dome-shaped. Hence, the upper surface 43 may comprise a concave shape and the lower surface 45 of the upper part 44 may comprise a correspondingly or complementary shaped convex shape. The roles of convex and concave shaped upper and lower surfaces of the intermediate part 42 and the upper part 43 may also swap. Typically, the domed surfaces 43, 45 comprise a convex and concave shape in both transverse directions relative to the rotation axis 51.

There is further provided another actuator 48 configured to selectively engage with the upper part 44. Also, the actuator 48 may comprise a pulse generator or a pulsing device configured to repeatedly apply a momentum onto an outer rim or a side surface of the upper part 44. In this way and due to the mutually corresponding dome-shaped surfaces 45, 43, the upper part 44 can be tilted relative to the intermediate part 42, as the dome-shaped surface 45 slides in the correspondingly shaped domed surface 43. The dome-shaped surfaces 43, 45 are in frictional engagement and remain in their mutual orientation even under the influence of gravity and when subject to a rotation relative to the rotation axis 51.

Once a decenter D and/or tilt T of a measurement surface 11 has been determined, controller 6 may be configured to adjust the alignment or positioning of the mount 40 relative to the reference axis 51. Accordingly, the controller 6 may control and activate the actuators 47, 48 in order to align and to position the optical element 10 for a subsequent high precision surface scanning process as shown in FIG. 13 or FIG. 15. During operation of the actuators 47, 48, the position and/or orientation of the optical element 10 could be monitored by the measurement head 60. In this way, the distance or position measurement provided by the measurement head 60 during a movement or alignment of the mount 40 constitutes a feedback loop. This may be of particular benefit for a highly precise and automated adjustment of calibration of the mount for a high precision surface scanning procedure.

In FIG. 20, a practical implementation of the mount 40 is illustrated. As illustrated there, the upper part 44 is provided with a chamfer 49 along its outer and/or upper side edge. The actuator 48 is configured to apply a momentum onto the upper part 44 and is aligned with respect to the chamfer 49 so as to impinge or to hit the chamfer 49 substantially perpendicularly. The further actuator 47 is aligned horizontally and is thus configured to apply a radially directed momentum onto the intermediate part 42.

In FIG. 19 one embodiment of the measurement device 1 is illustrated. The measurement device 1 is closely correlated to the device explained and described in greater detail in e.g. documents DE 10 2011 011 065 B4 or US 2017/0082521 A1. The measurement device 1 comprises a stationary base 81. At opposite lateral sides of the base 81 there extend upwardly pointing legs 83. The upper ends of the legs 83 are connected by a traverse 84. The traverse 84 and the legs 83 constitute a frame 82 attached to the base 81. The rotary measurement stage 50 is located on the bottom portion of the base 81. The base 81 may further comprise an upward pointing or upwardly extending backside 85. On this backside 85 there is provided a holder 90 and a distance measurement device 92. The holder 90 is movable at least with regard to two longitudinal directions, e.g. along a first horizontal direction (x) and a vertical direction (z). The holder 90 may be also movable along a second horizontal direction (y) relative to the rotary stage 50. The x-direction and y-direction may constitute a radial plane perpendicular to the axis of rotation 53 or reference axis 51.

The holder 90 is further provided with a bearing 91. The bearing 91 is rotationally mounted on the holder 90. Typically, the bearing 91 may comprise or define an axis of rotation extending along the y-direction. On the holder 90 there is further provided a reference body 95. The reference body 95 comprises a reference surface 96 facing towards the distance measurement device 92. The distance measurement device 92 comprises at least one distance sensor 93. The distance sensor 93 faces towards the mount 40 and hence towards the optical element 10 located on the mount 40. The optical element 10 may be positioned on a support 46 (FIG. 20). The support 46 may be positioned on the upper part 44 of the mount 40. With some embodiments the support 46 comprises a hydraulic expansion chuck allowing to fix and/or to securely hold the optical element 10.

The position of the distance measurement device 92 in a global coordinate system of the measurement device 1 can be precisely determined by at least a first reference sensor 88 pointing towards a first reference surface 86. The reference surface 86 extends vertically, hence along the z-direction, and is attached to one of the upward pointing legs 83. A second reference sensor 89 may face towards another reference surface 87 provided on the traverse 84. The reference surface 87 extends horizontally, e.g. along the x-direction.

The reference sensors 88, 89 are positioned and fixed on the holder 90. The reference sensors 88, 89 are configured to determine the position of the holder 90 in the x-z-plane. Both reference sensors 88, 89 may be implemented as distance sensors. The reference sensors 88, 89 are configured to determine a distance to the respective calibrated reference surfaces 86, 87, respectively.

The distance measurement device 92 is rotationally mounted on the holder 90 and is pivotable with regards to an axis of rotation extending substantially along the y-direction (e.g. axis of rotation 51). The distance measurement device 92 comprises a first distance sensor 93 facing towards the mount 40 and hence towards the optical element 10. The distance measurement device 92 further comprises a second distance sensor 94 facing towards the reference surface 96 of the reference body 95 that is fixed to the holder 90.

With the presently illustrated embodiment the first reference sensor 93 and the second reference sensor 94 extend in opposite, e.g. diametrically opposite directions. The second distance sensor 94 is configured to determine a distance between the distance measurement device 92 from the reference surface 96. In this way, any position changes of the distance measurement device 92 that might be due to a rotation of the distance measurement device 92 relative to the holder 90 can be precisely compensated and tracked.

Figure 21:
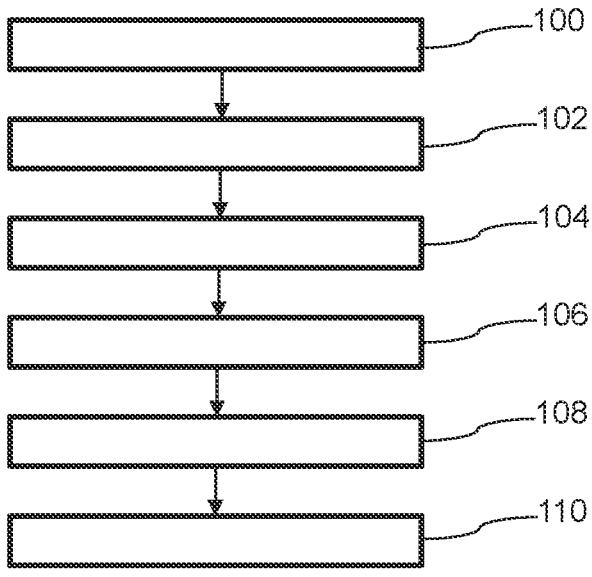
FIG. 21 is a flowchart of the method of measuring a surface or profile of an optical element.

The operation of the measurement device 1 and the numerous steps of the method of measuring of a surface 20, 30 or profile of the optical element 10 is further described in the flowchart of FIG. 21. In a first step 100 numerous, e.g. at least three measurement points 21, 22, 23 are defined on the measurement surface 11 of the optical element 10. Depending on the type of measurement surface 11, the total number of predefined measurement points may vary. With typical measurements, a comparatively large number of measurement points 21, 22, 23 is defined that are located on at least two measurement paths 25, 29 as for instance illustrated in FIGS. 5 and 6.

Thereafter, in step 102 the measurement head 60 is moved relative to the optical element 10 to scan along the measurement paths 25, 29. At least, the measurement device 1 is operated in such a way, that the first, second and third position of the numerous measurement points 21, 22, 23 is obtained. Based on the position measurements as obtained in step 102 in the subsequent step 104 at least one of a decenter D and a tilt T of the measurement surface 11 relative to a reference axis 51 is determined.

Based on the determined tilt T and/or decenter D, the optical element 10 is adjusted in step 106.

A precise adjustment and hence an elimination or substantial reduction of the tilt T and/or decenter D is of particular benefit for the subsequent high precision topology measurement of the measurement surface 11 as conducted in step 108. The topology measurement or surface measurement of the optical element 10 is typically conducted by rotating the optical element 10 by the rotary measurement stage 50 and by scanning over at least a portion or across the entirety of at least one of the measurement surfaces 20, 30, e.g. as schematically illustrated in FIG. 13 or FIG. 15. During or for the high precision topology measurement of the measurement surface the measurement head 60 and the respective measurement beam 61 is particularly focused on that surface 20, 30 that faces towards the measurement head 60.

Figure 9:
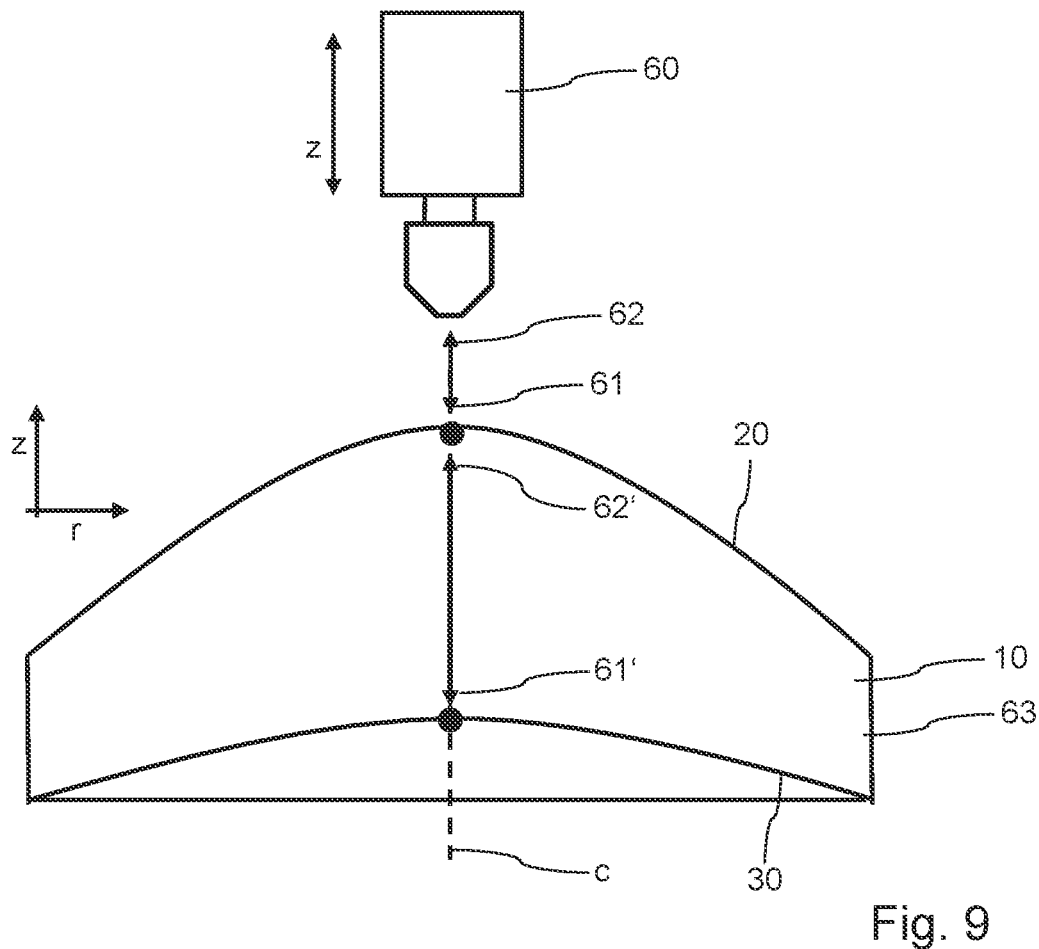
FIG. 9 shows an embodiment of the method and the measuring device for measuring a thickness of the optical element.

Once the topology measurement has been conducted as illustrated for instance in FIG. 13 the measurement head 60 may be aligned along the optical axis c of the optical element 10 as illustrated in FIG. 9. Thereafter, the measurement head 60 may be moved along the optical axis c to conduct a thickness measurement in step 110 as illustrated by the FIGS. 9-12.

In order to conduct a thickness measurement, the measurement range of the measurement head 60 should be less than the thickness of the optical element 10. With an interferometric measurement device 1, the coherence length of the measurement beam 61 should be shorter or smaller than a distance between the first surface 20 and the second surface 30 along the optical axis c. This can be obtained by making use of an appropriate light source 2 as well as by making use of an optical retarding element in the optical path of the signal beam and/or in the optical path of the reference beam of the interferometric measurement device 1.

The invention claimed is:

1. A method for interferometrically measuring a surface or a profile of an optical element having a first surface and a second surface opposite the first surface, the method comprising:

defining at least a first measurement point, a second measurement point and a third measurement point on a measurement surface of the optical element, the measurement surface being one of the first surface and the second surface;

measuring a first position of the first measurement point by directing a measurement beam from a measurement head onto the first measurement point, receiving by the measurement head a first measurement beam portion reflected at the first measurement point and detecting the first measurement beam portion by a detector optically coupled to the measurement head;

subsequently measuring at least a second position of the second measurement point and a third position of the third measurement point by directing the measurement beam onto the second measurement point and directing the measurement beam onto the third measurement point, receiving by the measurement head a second measurement beam portion reflected at the second measurement point and detecting a third measurement beam portion reflected at the third measurement point, respectively, and the second measurement beam portion and the third beam portion by the detector, respectively; and determining at least one of a decenter and a tilt of the measurement surface relative to a reference axis on the basis of at least the first position, the second position and the third position;

wherein one of the first surface and the second surface of the optical element facing towards the measurement head and the other one of the first surface and the second surface facing away from the measurement head is the measurement surface, wherein the first position, the second position and the third position is measured by directing the measurement beam onto a first target point, a second target point and a third target point, wherein the first target point, the second target point and the third target point are located on the one of the first surface and the second surface facing towards the measurement head, and wherein the measurement beam propagates through a medium of the optical element, and wherein any of the first, second and third measurement beams propagating from the respective first, second and third target points towards the first, second and third measurement points, respectively, hit the measurement surface substantially perpendicularly.

2. The method according to claim 1, wherein measuring at least one of the first position, the second position and the third position comprises focusing the measurement beam onto at least one of the first measurement point, the second measurement point and the third measurement point and detecting the respective measurement beam portion reflected at the at least one of the first measurement point, the second measurement point and the third measurement point, respectively.

3. The method according to claim 1, wherein a position of the first target point, the second target point and the third target point on the one of the first surface and the second surface facing towards the measurement head is determined on the basis of:

a refractive index of the medium of the optical element;

an angle of incidence of the measurement beam on the first target point, the second target point or the third target point; and a local surface profile of at least one of the first surface and the second surface in the region of the first measurement point, the second measurement point or the third measurement point and/or the respective first target point, the second target point or the third target point.

4. The method according to claim 1, wherein a first measurement path and a second measurement path are defined on the measurement surface, wherein at least two of the first measurement point, the second measurement point and the third measurement point are located on the first measurement path and wherein at least one of the first measurement point, the second measurement point and the third measurement point is located on the second measurement path.

5. The method according to claim 4, wherein at least one of the first measurement path and the second measurement path is a closed measurement path.

6. The method according to claim 4, wherein the first measurement path and the second measurement path are concentric with regards to an optical axis of the optical element or with regard to the reference axis.

7. The method according to claim 1, wherein the optical element is attached to a mount arranged on a measurement stage, the measurement stage being rotatable about an axis of rotation, wherein at least one of a radial position and an orientation of the mount relative to the axis of rotation is adjusted to minimize at least one of the decenter and the tilt of the optical element.

8. The method according to claim 1, wherein in a first measurement procedure at least one of the decenter and the tilt of one of the first surface and the second surface is determined and wherein in a second measurement procedure at least one of the decenter and the tilt of the other one of the first surface and the second surface is determined.

9. The method according to claim 1, wherein measuring the first, second and third positions of the respective first, second and third measurement points is conducted by measuring a path difference of the reflected measurement beam portion compared to a reference beam.

10. The method according to claim 1, wherein the detector is optically coupled to the measurement head via an optical circulator.

11. A non-transitory computer readable storage medium comprising a computer program comprising instructions, the instructions capable of being executed by a processor associated with an interferometric measuring device that measures a surface or a profile of an optical element having a first surface and a second surface opposite the first surface, wherein an interferometric measuring device, upon its processor executing the instructions, carries out the following:

defines at least a first measurement point, a second measurement point and a third measurement point on a measurement surface of the optical element, the measurement surface being one of the first surface and the second surface;

measures a first position of the first measurement point by directing a measurement beam from a measurement head onto the first measurement point, by receiving via the measurement head a first measurement beam portion reflected at the first measurement point, and by detecting the first measurement beam portion by a detector optically coupled to the measurement head;

subsequently measures at least a second position of the second measurement point and a third position of the third measurement point by directing the measurement beam onto the second measurement point and directing the measurement beam onto the third measurement point, by receiving via the measurement head a second measurement beam portion reflected at the second measurement point and a third measurement beam portion reflected at the third measurement point, respectively, and by detecting the second measurement beam portion and the third measurement beam portion by the detector, respectively; and determines at least one of a decenter and a tilt of the measurement surface relative to a reference axis on the basis of at least the first position, the second position and the third position;

wherein one of the first surface and the second surface of the optical element facing towards the measurement head and the other one of the first surface and the second surface facing away from the measurement head is the measurement surface, wherein the first position, the second position and the third position is measured by directing the measurement beam onto a first target point, a second target point and a third target point, wherein the first target point, the second target point and the third target point are located on the one of the first surface and the second surface facing towards the measurement head, and wherein the measurement beam propagates through a medium of the optical element, and wherein any of the first, second and third measurement beams propagating from the respective first, second and third target points towards the first, second and third measurement points, respectively, hit the measurement surface substantially perpendicularly.

12. The non-transitory computer readable storage medium according to claim 11, wherein measuring the first, second and third positions of the respective first, second and third measurement points is conducted by measuring a path difference of the reflected measurement beam portion compared to a reference beam.

13. The non-transitory computer readable storage medium according to claim 11, wherein the detector is optically coupled to the measurement head via an optical circulator.

14. An interferometric measuring device for measuring a surface or a profile of an optical element having a first surface and a second surface opposite the first surface, the measuring device comprising:

a light source for emitting a measurement beam;

a mount to fix the optical element;

a measurement head variably movable relative to the mount and optically coupled to the light source for directing a measurement beam onto a predefined first measurement point, onto a predefined second measurement point and onto a predefined third measurement point of the measurement surface, wherein the measurement head is further configured to receive a first measurement beam portion reflected at the first measurement point, a second measurement beam portion reflected at the second measurement point, and a third measurement beam portion reflected at the third measurement point, respectively;

a detector optically coupled to the measurement head for detecting the measurement beam portion reflected at least at the first measurement point, the second measurement point and the third measurement point;

a signal analyzer connected to the detector for determining at least a first position of the first measurement point, a second position of the second measurement point and a third position of the third measurement point, and for determining at least one of a decenter and a tilt of the measurement surface relative to a reference axis on the basis of at least the first position, the second position and the third position;

wherein the measurement head is positioned relative to the optical element to direct the measurement beam onto at least a first target point, a second target point and a third target point on one of a first surface and a second surface of the optical element opposite to the measurement surface and facing towards the measurement head, wherein each of the first target point, the second target point and the third target point correlates with one of the first measurement point, the second measurement point and the third measurement point, and wherein the measurement head is positioned such that the measurement beam entering a medium of the optical element at the first target point, at the second target point and at the third target point hits the measurement surface substantially perpendicularly and is internally retroreflected at the first measurement point, the second measurement point and the third measurement point, respectively.

15. The interferometric measuring device according to claim 14, wherein the mount is arranged on a rotary measurement stage defining the reference axis and wherein at least one of a radial position of the mount and an orientation of the mount relative to the reference axis is adjustable.

16. The interferometric measuring device according to claim 14, further comprising a controller operable to adjust at least one of a radial position of the mount and an orientation of the mount relative to the reference axis on the basis of at least one of the decenter and the tilt of the measurement surface.

17. The interferometric measuring device according to claim 14, further comprising a measurement head controller operable to move and/or to align the measurement head relative to the mount.

18. The interferometric measuring device according to claim 14, further comprising a reference beam, wherein a path difference is defined between the reflected measurement beam portion and the reference beam for measuring the first, second and third positions.

19. The interferometric measuring device according to claim 14, wherein the detector is optically coupled to the measurement head via an optical circulator.

\* \* \* \* \*